(12) United States Patent
Yang et al.

(10) Patent No.: US 12,038,192 B2
(45) Date of Patent: Jul. 16, 2024

(54) CONTROL METHODS AND DEVICES FOR A LOW-TEMPERATURE COOLING AIR VALVE

(71) Applicants: Hefei Midea Heating & Ventilating Equipment Co., Ltd., Anhui (CN); GD Midea Heating & Ventilating Equipment Co., Ltd., Foshan (CN)

(72) Inventors: Guozhong Yang, Hefei (CN); Xin Liang, Hefei (CN); Mingren Wang, Hefei (CN); Zhijun Tan, Hefei (CN)

(73) Assignees: HEFEI MIDEA HEATING & VENTILATING EQUIPMENT CO., LTD., Hefei (CN); GD MIDEA HEATING & VENTILATING EQUIPMENT CO., LTD., Foshan (CN)

(*) Notice: Subject to any disclaimer, the term of this patent is extended or adjusted under 35 U.S.C. 154(b) by 495 days.

(21) Appl. No.: 17/361,190

(22) Filed: Jun. 28, 2021

(65) Prior Publication Data

US 2021/0325071 A1 Oct. 21, 2021

Related U.S. Application Data

(63) Continuation of application No. PCT/CN2019/090144, filed on Jun. 5, 2019.

(30) Foreign Application Priority Data

Dec. 29, 2018 (CN) .......................... 201811641535.1

(51) Int. Cl.
*F24F 11/64* (2018.01)
*F24F 11/70* (2018.01)
(Continued)

(52) U.S. Cl.
CPC .............. *F24F 11/64* (2018.01); *F24F 11/70* (2018.01); *F24F 11/80* (2018.01); *F24F 11/84* (2018.01);
(Continued)

(58) Field of Classification Search
CPC .. F24F 11/64; F24F 11/80; F24F 11/84; F24F 11/70; G05B 19/042
(Continued)

(56) References Cited

U.S. PATENT DOCUMENTS 4,975,024 A * 12/1990 Heckel ................ F04D 27/0284
417/18
2017/0115037 A1 * 4/2017 Tropea ........................ B63J 2/04
(Continued)

FOREIGN PATENT DOCUMENTS

CN 1851364 A * 10/2006
CN 1851364 A 10/2006
(Continued)

OTHER PUBLICATIONS

Midea Group Co., Ltd., CA Office Action, Canadian Patent Application No. 3,125,225, Sep. 26, 2022, 5 pgs.
(Continued)

*Primary Examiner* — Mohammad Ali
*Assistant Examiner* — Joshua T Sanders
(74) *Attorney, Agent, or Firm* — Morgan, Lewis & Bockius LLP

(57) ABSTRACT

A control method and device for a low-temperature cooling air valve include: obtaining an actual system pressure, an ambient temperature, and a system energy requirement; and determining an opening degree pre according to the actual system pressure, the ambient temperature, and the system energy requirement. The control method is employed to perform combined control on the low-temperature cooling
(Continued)

air valve according to the system high pressure, the ambient temperature and the system energy requirement, and can refine the range of opening degrees of the low-temperature cooling air valve and determine an opening degree thereof, thereby facilitating cooling operation of a multi-split air conditioning system in an ultra-low temperature environment, while also increasing the reliability of the cooling operation at low temperature and expanding the operation range.

18 Claims, 11 Drawing Sheets

(51) Int. Cl.
  F24F 11/80    (2018.01)
  F24F 11/84    (2018.01)
  F24F 110/12   (2018.01)
  G05B 19/042   (2006.01)
(52) U.S. Cl.
  CPC ........ *G05B 19/042* (2013.01); *F24F 2110/12* (2018.01); *G05B 2219/2614* (2013.01)
(58) Field of Classification Search
  USPC ......................................................... 700/286
  See application file for complete search history.

(56) References Cited

U.S. PATENT DOCUMENTS

2020/0158393 A1*  5/2020  Burg ................. F25B 1/10
2021/0325071 A1   10/2021  Yang et al.

FOREIGN PATENT DOCUMENTS

| CN | 101915450 A | 12/2010 | |
| CN | 203240832 U | 10/2013 | |
| CN | 203615637 U | 5/2014 | |
| CN | 104633815 A | 5/2015 | |
| CN | 105352109 A | 2/2016 | |
| CN | 205403281 U | 7/2016 | |
| CN | 106052020 A | 10/2016 | |
| CN | 205783936 U | 12/2016 | |
| CN | 106524330 A | 3/2017 | |
| CN | 107152822 A * | 9/2017 | ............. F25B 49/02 |
| CN | 107152822 A | 9/2017 | |
| CN | 107328074 A | 11/2017 | |
| CN | 107806675 A | 3/2018 | |
| CN | 108131803 A | 6/2018 | |
| CN | 108344086 A | 7/2018 | |
| CN | 109708274 A | 5/2019 | |
| JP | 2003536041 A | 12/2003 | |
| JP | 2014190554 A | 10/2014 | |
| JP | 2016090102 A | 5/2016 | |
| WO | WO 2020133926 A1 | 7/2020 | |

OTHER PUBLICATIONS

Hefei Midea HVAC Equipment Co., Ltd., International Search Report and Written Opinion, PCT/CN201909144, Jun. 5, 2019, 13 pgs.
Guangdong Meidi Heating Ventilation Equip. Co., Ltd., First Office Action, CN Application No. 201811641535.1, Dec. 19, 2019, 11 pgs.
Guangdong Meidi Heating Ventilation Equip. Co., Ltd., The Second Office Action, CN Application No. 201811641535.1, Aug. 19, 2020, 11 pgs.
Guangdong Meidi Heating Ventilation Equip. Co., Ltd., The Third Office Action, CN Application No. 201811641535.1, Mar. 2, 2021, 5 pgs.

* cited by examiner determining that the opening degree of the low-temperature cooling air valve is a fifth preset opening degree, if the opening degree range of the low-temperature cooling air valve is decreased by the first preset percentage relative to the first preset range, and an energy demand range within which the system energy demand is is the minimum energy demand range — S20 determining that the opening degree of the low-temperature cooling air valve is a sixth preset opening degree, if the opening degree range of the low-temperature cooling air valve is decreased by the first preset percentage relative to the first preset range, and the energy demand range within which the system energy demand is is a first energy demand range, wherein the fifth preset opening degree is lower than the sixth preset opening degree — S21 determining that the opening degree of the low-temperature cooling air valve is a seventh preset opening degree, if the opening degree range of the low-temperature cooling air valve is decreased by the first preset percentage relative to the first preset range, and the energy demand range within which the system energy demand is is a second energy demand range, wherein the sixth preset opening degree is lower than the seventh preset opening degree — S22 determining that the opening degree of the low-temperature cooling air valve is an eighth preset opening degree, if the opening degree range of the low-temperature cooling air valve is decreased by the first preset percentage relative to the first preset range, and the energy demand range within which the system energy demand is is the maximum demand range, wherein the seventh preset opening degree is lower than the eighth preset opening degree — S23

Figure 6 determining that the opening degree of the low-temperature cooling air valve is a ninth preset opening degree, if the opening degree range of the low-temperature cooling air valve is decreased by the second preset percentage relative to the first preset range, and an energy demand range within which the system energy demand is is the minimum energy demand range — S30 determining that the opening degree of the low-temperature cooling air valve is a tenth preset opening degree, if the opening degree range of the low-temperature cooling air valve is decreased by the second preset percentage relative to the first preset range, and the energy demand range within which the system energy demand is is a first energy demand range, wherein the ninth preset opening degree is lower than the tenth preset opening degree — S31 determining that the opening degree of the low-temperature cooling air valve is an eleventh preset opening degree, if the opening degree range of the low-temperature cooling air valve is decreased by the second preset percentage relative to the first preset range, and the energy demand range within which the system energy demand is is a second energy demand range, wherein the tenth preset opening degree is lower than the eleventh preset opening degree — S32 determining that the opening degree of the low-temperature cooling air valve is a twelfth preset opening degree, if the opening degree range of the low-temperature cooling air valve is decreased by the second preset percentage relative to the first preset range, and the energy demand range within which the system energy demand is is the maximum energy demand range, wherein the eleventh preset opening degree is lower than the twelfth preset opening degree — S33

Figure 7 determining that the opening degree of the low-temperature cooling air valve is a thirteenth preset opening degree, if the opening degree range of the low-temperature cooling air valve is the minimum value within the first preset range, and an energy demand range within which the system energy demand is is the minimum energy demand range — S40 determining that the opening degree of the low-temperature cooling air valve is a fourteenth preset opening degree, if the opening degree range of the low-temperature cooling air valve is the minimum value within the first preset range, and the energy demand range within which the system energy demand is is a first energy demand range, wherein the thirteenth preset opening degree is lower than the fourteenth preset opening degree — S41 determining that the opening degree of the low-temperature cooling air valve is a fifteenth preset opening degree, if the opening degree range of the low-temperature cooling air valve is the minimum value within the first preset range, and the energy demand range within which the system energy demand is is a second energy demand range, wherein the fourteenth preset opening degree is lower than the fifteenth preset opening degree — S42 determining that the opening degree of the low-temperature cooling air valve is a sixteenth preset opening degree, if the opening degree range of the low-temperature cooling air valve is the minimum value within the first preset range, and the energy demand range within which the system energy demand is is the maximum energy demand range, wherein the fifteenth preset opening degree is lower than the sixteenth preset opening degree — S43

Figure 8 it is determined that the opening degree of the low-temperature cooling air valve is a seventeenth preset opening degree, if the opening degree range of the low-temperature cooling air valve is the maximum value within the second preset range, and an energy demand range within which the system energy demand is is the minimum energy demand range — S50 it is determined that the opening degree of the low-temperature cooling air valve is an eighteenth preset opening degree, if the opening degree range of the low-temperature cooling air valve is the maximum value within the second preset range, and the energy demand range within which the system energy demand is is a first energy demand range, wherein the seventeenth preset opening degree is lower than the eighteenth preset opening degree — S51 it is determined that the opening degree of the low-temperature cooling air valve is a nineteenth preset opening degree, if the opening degree range of the low-temperature cooling air valve is the maximum value within the second preset range, and the energy demand range within which the system energy demand is is a second energy demand range, wherein the nineteenth preset opening degree is lower than the eighteenth preset opening degree — S52 it is determined that the opening degree of the low-temperature cooling air valve is a twentieth preset opening degree, if the opening degree range of the low-temperature cooling air valve is the maximum value within the second preset range, and the energy demand range within which the system energy demand is is the maximum energy demand range, wherein the nineteenth preset opening degree is lower than the twentieth preset opening degree — S53

Figure 9 determining that the opening degree of the low-temperature cooling air valve is a twenty-first preset opening degree, if the opening degree range of the low-temperature cooling air valve is decreased by the first preset percentage relative to the second preset range, and an energy demand range within which the system energy demand is is the minimum energy demand range — S60 determining that the opening degree of the low-temperature cooling air valve is a twenty-second preset opening degree, if the opening degree range of the low-temperature cooling air valve is decreased by the first preset percentage relative to the second preset range, and the energy demand range within which the system energy demand is is a first energy demand range, wherein the twenty-first preset opening degree is lower than the twenty-second preset opening degree — S61 determining that the opening degree of the low-temperature cooling air valve is a twenty-third preset opening degree, if the opening degree range of the low-temperature cooling air valve is decreased by the first preset percentage relative to the second preset range, and the energy demand range within which the system energy demand is is a second energy demand range, wherein the twenty-first preset opening degree is lower than the twenty-third preset opening degree — S62 determining that the opening degree of the low-temperature cooling air valve is a twenty-fourth preset opening degree, if the opening degree range of the low-temperature cooling air valve is decreased by the first preset percentage relative to the second preset range, and the energy demand range within which the system energy demand is is the maximum energy demand range, wherein the twenty-third preset opening degree is lower than the twenty-fourth preset opening degree — S63

Figure 10 determining that the opening degree of the low-temperature cooling air valve is a twenty-fifth preset opening degree, if the opening degree range of the low-temperature cooling air valve is decreased by the second preset percentage relative to the second preset range, and an energy demand range within which the system energy demand is is the minimum energy demand range — S70 determining that the opening degree of the low-temperature cooling air valve is a twenty-sixth preset opening degree, if the opening degree range of the low-temperature cooling air valve is decreased by the second preset percentage relative to the second preset range, and the energy demand range within which the system energy demand is is a first energy demand range, wherein the twenty-fifth preset opening degree is lower than the twenty-sixth preset opening degree — S71 determining that the opening degree of the low-temperature cooling air valve is a twenty-seventh preset opening degree, if the opening degree range of the low-temperature cooling air valve is decreased by the second preset percentage relative to the second preset range, and the energy demand range within which the system energy demand is is a second energy demand range, wherein the twenty-sixth preset opening degree is lower than the twenty-seventh preset opening degree — S72 determining that the opening degree of the low-temperature cooling air valve is a twenty-eighth preset opening degree, if the opening degree range of the low-temperature cooling air valve is decreased by the second preset percentage relative to the second preset range, and the energy demand range within which the system energy demand is is the maximum energy demand range, wherein the twenty-seventh preset opening degree is lower than the twenty-eighth preset opening degree — S73

Figure 11 determining that the opening degree of the low-temperature cooling air valve is a twenty-ninth preset opening degree, if the opening degree range of the low-temperature cooling air valve is the minimum value within the second preset range, and an energy demand range within which the system energy demand is is the minimum energy demand range — S80 determining that the opening degree of the low-temperature cooling air valve is a thirtieth preset opening degree, if the opening degree range of the low-temperature cooling air valve is the minimum value within the second preset range, and the energy demand range within which the system energy demand is is a first energy demand range, wherein the twenty-ninth preset opening degree is lower than the thirtieth preset opening degree — S81 determining that the opening degree of the low-temperature cooling air valve is a thirty-first preset opening degree, if the opening degree range of the low-temperature cooling air valve is the minimum value within the second preset range, and the energy demand range within which the system energy demand is is a second energy demand range, wherein the thirtieth preset opening degree is lower than the thirty-first preset opening degree — S82 determining that the opening degree of the low-temperature cooling air valve is a thirty-second preset opening degree, if the opening degree range of the low-temperature cooling air valve is the minimum value within the second preset range, and the energy demand range within which the system energy demand is is the maximum energy demand range, wherein the thirty-first preset opening degree is lower than the thirty-second preset opening degree — S83

Figure 12

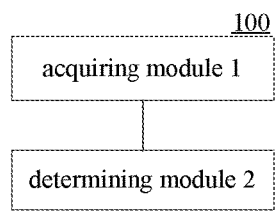

Figure 13

CONTROL METHODS AND DEVICES FOR A LOW-TEMPERATURE COOLING AIR VALVE

CROSS-REFERENCE TO RELATED APPLICATIONS

This application is a continuation of PCT International Application No. PCT/CN2019/090144, filed Jun. 5, 2019, which claims the benefit of Chinese Application No. 201811641535.1, filed on Dec. 29, 2018, filed with China National Intellectual Property Administration, and entitled "Control Method and Device for Low-Temperature Cooling Air Valve," each of which is incorporated herein by reference.

FIELD

The present disclosure relates to the field of the air conditioner technology, particularly to a control method for a low-temperature cooling air valve and a control device for a low-temperature cooling air valve.

BACKGROUND

With the continuous increase of market demand, a cooling capacity when an external environment temperature is low has attracted more and more attention from users. However, in the external low temperature environment, a temperature difference between a condensing temperature of a condenser of an outdoor unit and an ambient temperature is too large, and condensation heat dissipation is too large, which may easily cause a series of issues, for example, low values for a high pressure and a low pressure for the system, liquid accumulation in a heat exchanger, and a difficulty in starting a compressor.

At present, the related art includes optimizing a control strategy of multi-split air conditioners, such as reducing a fan speed of the outdoor unit, turning off some heat exchangers, switching some external heat exchangers from condensers to evaporators in a designing manner, and controlling an opening degree of a throttling component in the system.

However, the problem existing in the related art lies in that, in an ultra-low temperature environment (such as below −15° C.), a convective heat exchange between the heat exchanger and the air still cannot match requirements of the refrigeration load, and cannot meet the refrigeration demand.

SUMMARY

The present disclosure aims to solve one of the technical problems in the related art at least to a certain extent. For this, a first object of the present disclosure is to provide a control method for a low-temperature cooling air valve, which is able to refine an opening degree range of the low-temperature cooling air valve, and determining an opening degree of the low-temperature cooling air valve, thus favoring a cooling operation under an ultra-low temperature environment of a multi-split air conditioner, and at the same time improving reliability of the cooling operation at a low temperature, as well as expanding a cooling operation range.

A second object of the present disclosure is to provide a control device for a low-temperature cooling air valve.

In order to achieve the above objects, in a first aspect, the present disclosure provides in embodiments a control method for a low-temperature cooling air valve, including: acquiring an actual system pressure, an ambient temperature and a system energy demand; and determining an opening degree of the low-temperature cooling air valve according to the actual system pressure, the ambient temperature and the system energy demand.

According to some embodiments of the present disclosure, the control method for a low-temperature cooling air valve acquires the actual system pressure, the ambient temperature, and the system energy demand; and determines the opening degree of the low-temperature cooling air valve according to the actual system pressure, the ambient temperature, and the system energy demand, such that the low-temperature cooling air valve is coupling controlled according to the system high-pressure, the ambient temperature and the system energy demand, thereby being capable of refining the opening degree range of the low-temperature cooling air valve, and determining the opening degree of the low-temperature cooling air valve, thus favoring the cooling operation under the ultra-low temperature environment of a multi-split air conditioner, and at the same time improving reliability of the cooling operation at a low temperature, as well as expanding a cooling operation range.

In addition, the control method for a low-temperature cooling air valve according to the above embodiment of the present disclosure may further have the following additional technical features.

According to some embodiments of the present disclosure, the actual system pressure is a discharge pressure of a compressor and a condensing pressure of a condenser.

According to some embodiments of the present disclosure, said determining an opening degree of the low-temperature cooling air valve according to the actual system pressure, the ambient temperature and the system energy demand specifically includes: determining that the opening degree of the low-temperature cooling air valve is fully open, if the actual system pressure is greater than the maximum preset pressure value; determining that an opening degree range of the low-temperature cooling air valve is a first preset range, if the actual system pressure is lower than or equal to the maximum preset pressure value, and greater than a second preset pressure value; determining that the opening degree range of the low-temperature cooling air valve is a second preset range, if the actual system pressure is lower than or equal to the second preset pressure value, and greater than a third preset pressure value, wherein the second preset range is lower than the first preset range; and determining that the opening degree of the low-temperature cooling air valve is fully closed, if the actual system pressure is lower than the minimum preset pressure value.

According to some embodiments of the present disclosure, the control method further includes: further determining that the opening degree range of the low-temperature cooling air valve is the maximum value within the first preset range, if the opening degree range of the low-temperature cooling air valve is the first preset range, and the ambient temperature is greater than the maximum preset temperature value; further determining that the opening degree range of the low-temperature cooling air valve is decreased by a first preset percentage relative to the first preset range, if the opening degree range of the low-temperature cooling air valve is the first preset range, and the ambient temperature is lower than or equal to the maximum preset temperature value, and greater than a second preset temperature value; further determining that the opening degree range of the low-temperature cooling air valve is decreased by a second preset percentage relative to the first preset range, if the opening degree range of the low-temperature cooling air valve is the first preset range, and the ambient temperature is lower than or equal to the second preset temperature value, and greater than a third preset temperature value, wherein the first preset percentage is lower than the second preset percentage; and further determining that the opening degree range of the low-temperature cooling air valve is the minimum value within the first preset range, if the opening degree range of the low-temperature cooling air valve is the first preset range, and the ambient temperature is lower than the minimum preset temperature value.

According to some embodiments of the present disclosure, it is further determined that the opening degree range of the low-temperature cooling air valve is the maximum value within the second preset range, if the opening degree range of the low-temperature cooling air valve is the second preset range, and the ambient temperature is greater than the maximum preset temperature value; it is further determined that the opening degree range of the low-temperature cooling air valve is decreased by a first preset percentage relative to the second preset range, if the opening degree range of the low-temperature cooling air valve is the second preset range, and the ambient temperature is lower than or equal to the maximum preset temperature value, and greater than a second preset temperature value; it is further determined that the opening degree range of the low-temperature cooling air valve is decreased by a second preset percentage relative to the second preset range, if the opening degree range of the low-temperature cooling air valve is the second preset range, and the ambient temperature is lower than or equal to the second preset temperature value, and greater than a third preset temperature value, wherein the first preset percentage is lower than the second preset percentage; and it is further determined that the opening degree range of the low-temperature cooling air valve is the minimum value within the second preset range, if the opening degree range of the low-temperature cooling air valve is the second preset range, and the ambient temperature is lower than the minimum preset temperature value.

According to some embodiments of the present disclosure, it is determined that the opening degree of the low-temperature cooling air valve is a first preset opening degree, if the opening degree range of the low-temperature cooling air valve is the maximum value within the first preset range, and an energy demand range within which the system energy demand is the minimum energy demand range; it is determined that the opening degree of the low-temperature cooling air valve is a second preset opening degree, if the opening degree range of the low-temperature cooling air valve is the maximum value within the first preset range, and the energy demand range within which the system energy demand is a first energy demand range, wherein the first preset opening degree is lower than the second preset opening degree; it is determined that the opening degree of the low-temperature cooling air valve is a third preset opening degree, if the opening degree range of the low-temperature cooling air valve is the maximum value within the first preset range, and the energy demand range within which the system energy demand is a second energy demand range, wherein the second preset opening degree is lower than the third preset opening degree, and the first energy demand range is lower than the second energy demand range; and it is determined that the opening degree of the low-temperature cooling air valve is a fourth preset opening degree, if the opening degree range of the low-temperature cooling air valve is the maximum value within the first preset range, and the energy demand range within which the system energy demand is the maximum energy demand range, wherein the third preset opening degree is lower than the fourth preset opening degree.

According to some embodiments of the present disclosure, it is determined that the opening degree of the low-temperature cooling air valve is a fifth preset opening degree, if the opening degree range of the low-temperature cooling air valve is decreased by the first preset percentage relative to the first preset range, and an energy demand range within which the system energy demand is the minimum energy demand range; it is determined that the opening degree of the low-temperature cooling air valve is a sixth preset opening degree, if the opening degree range of the low-temperature cooling air valve is decreased by the first preset percentage relative to the first preset range, and the energy demand range within which the system energy demand is a first energy demand range, wherein the fifth preset opening degree is lower than the sixth preset opening degree; it is determined that the opening degree of the low-temperature cooling air valve is a seventh preset opening degree, if the opening degree range of the low-temperature cooling air valve is decreased by the first preset percentage relative to the first preset range, and the energy demand range within which the system energy demand is a second energy demand range, wherein the sixth preset opening degree is lower than the seventh preset opening degree; and it is determined that the opening degree of the low-temperature cooling air valve is an eighth preset opening degree, if the opening degree range of the low-temperature cooling air valve is decreased by the first preset percentage relative to the first preset range, and the energy demand range within which the system energy demand is the maximum demand range, wherein the seventh preset opening degree is lower than the eighth preset opening degree.

According to some embodiments of the present disclosure, it is determined that the opening degree of the low-temperature cooling air valve is a ninth preset opening degree, if the opening degree range of the low-temperature cooling air valve is decreased by the second preset percentage relative to the first preset range, and an energy demand range within which the system energy demand is the minimum energy demand range; it is determined that the opening degree of the low-temperature cooling air valve is a tenth preset opening degree, if the opening degree range of the low-temperature cooling air valve is decreased by the second preset percentage relative to the first preset range, and the energy demand range within which the system energy demand Isa first energy demand range, wherein the ninth preset opening degree is lower than the tenth preset opening degree; it is determined that the opening degree of the low-temperature cooling air valve is an eleventh preset opening degree, if the opening degree range of the low-temperature cooling air valve is decreased by the second preset percentage relative to the first preset range, and the energy demand range within which the system energy demand is a second energy demand range, wherein the tenth preset opening degree is lower than the eleventh preset opening degree; and it is determined that the opening degree of the low-temperature cooling air valve is a twelfth preset opening degree, if the opening degree range of the low-temperature cooling air valve is decreased by the second preset percentage relative to the first preset range, and the energy demand range within which the system energy demand is the maximum energy demand range, wherein the eleventh preset opening degree is lower than the twelfth preset opening degree.

According to some embodiments of the present disclosure, it is determined that the opening degree of the low-temperature cooling air valve is a thirteenth preset opening degree, if the opening degree range of the low-temperature cooling air valve is the minimum value within the first preset range, and an energy demand range within which the system energy demand is the minimum energy demand range; it is determined that the opening degree of the low-temperature cooling air valve is a fourteenth preset opening degree, if the opening degree range of the low-temperature cooling air valve is the minimum value within the first preset range, and the energy demand range within which the system energy demand is a first energy demand range, wherein the thirteenth preset opening degree is lower than the fourteenth preset opening degree; it is determined that the opening degree of the low-temperature cooling air valve is a fifteenth preset opening degree, if the opening degree range of the low-temperature cooling air valve is the minimum value within the first preset range, and the energy demand range within which the system energy demand is a second energy demand range, wherein the fourteenth preset opening degree is lower than the fifteenth preset opening degree; and it is determined that the opening degree of the low-temperature cooling air valve is a sixteenth preset opening degree, if the opening degree range of the low-temperature cooling air valve is the minimum value within the first preset range, and the energy demand range within which the system energy demand is the maximum energy demand range, wherein the fifteenth preset opening degree is lower than the sixteenth preset opening degree.

According to some embodiments of the present disclosure, it is determined that the opening degree of the low-temperature cooling air valve is a seventeenth preset opening degree, if the opening degree range of the low-temperature cooling air valve is the maximum value within the second preset range, and an energy demand range within which the system energy demand is the minimum energy demand range; it is determined that the opening degree of the low-temperature cooling air valve is an eighteenth preset opening degree, if the opening degree range of the low-temperature cooling air valve is the maximum value within the second preset range, and the energy demand range within which the system energy demand is a first energy demand range, wherein the seventeenth preset opening degree is lower than the eighteenth preset opening degree; it is determined that the opening degree of the low-temperature cooling air valve is a nineteenth preset opening degree, if the opening degree range of the low-temperature cooling air valve is the maximum value within the second preset range, and the energy demand range within which the system energy demand is a second energy demand range, wherein the nineteenth preset opening degree is lower than the eighteenth preset opening degree; and it is determined that the opening degree of the low-temperature cooling air valve is a twentieth preset opening degree, if the opening degree range of the low-temperature cooling air valve is the maximum value within the second preset range, and the energy demand range within which the system energy demand is the maximum energy demand range, wherein the nineteenth preset opening degree is lower than the twentieth preset opening degree.

According to some embodiments of the present disclosure, it is determined that the opening degree of the low-temperature cooling air valve is a twenty-first preset opening degree, if the opening degree range of the low-temperature cooling air valve is decreased by the first preset percentage relative to the second preset range, and an energy demand range within which the system energy demand is the minimum energy demand range; it is determined that the opening degree of the low-temperature cooling air valve is a twenty-second preset opening degree, if the opening degree range of the low-temperature cooling air valve is decreased by the first preset percentage relative to the second preset range, and the energy demand range within which the system energy demand is a first energy demand range, wherein the twenty-first preset opening degree is lower than the twenty-second preset opening degree; it is determined that the opening degree of the low-temperature cooling air valve is a twenty-third preset opening degree, if the opening degree range of the low-temperature cooling air valve is decreased by the first preset percentage relative to the second preset range, and the energy demand range within which the system energy demand is a second energy demand range, wherein the twenty-first preset opening degree is lower than the twenty-third preset opening degree; and it is determined that the opening degree of the low-temperature cooling air valve is a twenty-fourth preset opening degree, if the opening degree range of the low-temperature cooling air valve is decreased by the first preset percentage relative to the second preset range, and the energy demand range within which the system energy demand is the maximum energy demand range, wherein the twenty-third preset opening degree is lower than the twenty-fourth preset opening degree.

According to some embodiments of the present disclosure, it is determined that the opening degree of the low-temperature cooling air valve is a twenty-fifth preset opening degree, if the opening degree range of the low-temperature cooling air valve is decreased by the second preset percentage relative to the second preset range, and an energy demand range within which the system energy demand is the minimum energy demand range; it is determined that the opening degree of the low-temperature cooling air valve is a twenty-sixth preset opening degree, if the opening degree range of the low-temperature cooling air valve is decreased by the second preset percentage relative to the second preset range, and the energy demand range within which the system energy demand is a first energy demand range, wherein the twenty-fifth preset opening degree is lower than the twenty-sixth preset opening degree; it is determined that the opening degree of the low-temperature cooling air valve is a twenty-seventh preset opening degree, if the opening degree range of the low-temperature cooling air valve is decreased by the second preset percentage relative to the second preset range, and the energy demand range within which the system energy demand is a second energy demand range, wherein the twenty-sixth preset opening degree is lower than the twenty-seventh preset opening degree; and it is determined that the opening degree of the low-temperature cooling air valve is a twenty-eighth preset opening degree, if the opening degree range of the low-temperature cooling air valve is decreased by the second preset percentage relative to the second preset range, and the energy demand range within which the system energy demand is the maximum energy demand range, wherein the twenty-seventh preset opening degree is lower than the twenty-eighth preset opening degree.

According to some embodiments of the present disclosure, it is determined that the opening degree of the low-temperature cooling air valve is a twenty-ninth preset opening degree, if the opening degree range of the low-temperature cooling air valve is the minimum value within the second preset range, and an energy demand range within which the system energy demand is the minimum energy demand range; it is determined that the opening degree of the low-temperature cooling air valve is a thirtieth preset opening degree, if the opening degree range of the low-temperature cooling air valve is the minimum value within the second preset range, and the energy demand range within which the system energy demand is a first energy demand range, wherein the twenty-ninth preset opening degree is lower than the thirtieth preset opening degree; it is determined that the opening degree of the low-temperature cooling air valve is a thirty-first preset opening degree, if the opening degree range of the low-temperature cooling air valve is the minimum value within the second preset range, and the energy demand range within which the system energy demand is a second energy demand range, wherein the thirtieth preset opening degree is lower than the thirty-first preset opening degree; and it is determined that the opening degree of the low-temperature cooling air valve is a thirty-second preset opening degree, if the opening degree range of the low-temperature cooling air valve is the minimum value within the second preset range, and the energy demand range within which the system energy demand is the maximum energy demand range, wherein the thirty-first preset opening degree is lower than the thirty-second preset opening degree.

In order to achieve the above objects of the present disclosure, in a second aspect, the present disclosure provides in embodiments a control device for a low-temperature cooling air valve, including: an acquiring module, configured to acquire an actual system pressure, an ambient temperature and a system energy demand; and a determining module, configured to determine an opening degree of the low-temperature cooling air valve according to the actual system pressure, the ambient temperature and the system energy demand.

According to some embodiments of the present disclosure, the control device for a low-temperature cooling air valve acquires the actual system pressure, the ambient temperature, and the system energy demand by the acquiring module; and determines the opening degree of the low-temperature cooling air valve according to the actual system pressure, the ambient temperature, and the system energy demand by the determining module, such that the low-temperature cooling air valve is coupling controlled according to the system high-pressure, the ambient temperature and the system energy demand, thereby being capable of refining the opening degree range of the low-temperature cooling air valve, and determining the opening degree of the low-temperature cooling air valve, thus favoring the cooling operation under the ultra-low temperature environment of a multi-split air conditioner, and at the same time improving reliability of the cooling operation at a low temperature, as well as expanding a cooling operation range.

In addition, the control device for a low-temperature cooling air valve according to the above embodiment of the present disclosure may further have the following additional technical features.

According to some embodiments of the present disclosure, the actual system pressure is a discharge pressure of a compressor and a condensing pressure of a condenser.

According to some embodiments of the present disclosure, the determining module is further configured to: determine that the opening degree of the low-temperature cooling air valve is fully open, if the actual system pressure is greater than the maximum preset pressure value; determine that an opening degree range of the low-temperature cooling air valve is a first preset range, if the actual system pressure is lower than or equal to the maximum preset pressure value, and greater than a second preset pressure value; determine that the opening degree range of the low-temperature cooling air valve is a second preset range, if the actual system pressure is lower than or equal to the second preset pressure value, and greater than a third preset pressure value, wherein the second preset range is lower than the first preset range; and determine that the opening degree of the low-temperature cooling air valve is fully closed, if the actual system pressure is lower than the minimum preset pressure value.

According to some embodiments of the present disclosure, the determining module is further configured to: further determine that the opening degree range of the low-temperature cooling air valve is the maximum value within the first preset range, if the opening degree range of the low-temperature cooling air valve is the first preset range, and the ambient temperature is greater than the maximum preset temperature value; further determine that the opening degree range of the low-temperature cooling air valve is decreased by a first preset percentage relative to the first preset range, if the opening degree range of the low-temperature cooling air valve is the first preset range, and the ambient temperature is lower than or equal to the maximum preset temperature value, and greater than a second preset temperature value; further determine that the opening degree range of the low-temperature cooling air valve is decreased by a second preset percentage relative to the first preset range, if the opening degree range of the low-temperature cooling air valve is the first preset range, and the ambient temperature is lower than or equal to the second preset temperature value, and greater than a third preset temperature value, wherein the first preset percentage is lower than the second preset percentage; and further determine that the opening degree range of the low-temperature cooling air valve is the minimum value within the first preset range, if the opening degree range of the low-temperature cooling air valve is the first preset range, and the ambient temperature is lower than the minimum preset temperature value.

According to some embodiments of the present disclosure, the determining module is further configured to: further determine that the opening degree range of the low-temperature cooling air valve is the maximum value within the second preset range, if the opening degree range of the low-temperature cooling air valve is the second preset range, and the ambient temperature is greater than the maximum preset temperature value; further determine that the opening degree range of the low-temperature cooling air valve is decreased by a first preset percentage relative to the second preset range, if the opening degree range of the low-temperature cooling air valve is the second preset range, and the ambient temperature is lower than or equal to the maximum preset temperature value, and greater than a second preset temperature value; further determine that the opening degree range of the low-temperature cooling air valve is decreased by a second preset percentage relative to the second preset range, if the opening degree range of the low-temperature cooling air valve is the second preset range, and the ambient temperature is lower than or equal to the second preset temperature value, and greater than a third preset temperature value, wherein the first preset percentage is lower than the second preset percentage; and further determine that the opening degree range of the low-temperature cooling air valve is the minimum value within the second preset range, if the opening degree range of the low-temperature cooling air valve is the second preset range, and the ambient temperature is lower than the minimum preset temperature value.

According to some embodiments of the present disclosure, the determining module is further configured to: determine that the opening degree of the low-temperature cooling air valve is a first preset opening degree, if the opening degree range of the low-temperature cooling air valve is the maximum value within the first preset range, and an energy demand range within which the system energy demand is the minimum energy demand range; determine that the opening degree of the low-temperature cooling air valve is a second preset opening degree, if the opening degree range of the low-temperature cooling air valve is the maximum value within the first preset range, and the energy demand range within which the system energy demand is a first energy demand range, wherein the first preset opening degree is lower than the second preset opening degree; determine that the opening degree of the low-temperature cooling air valve is a third preset opening degree, if the opening degree range of the low-temperature cooling air valve is the maximum value within the first preset range, and the energy demand range within which the system energy demand is a second energy demand range, wherein the second preset opening degree is lower than the third preset opening degree, and the first energy demand range is lower than the second energy demand range; and determine that the opening degree of the low-temperature cooling air valve is a fourth preset opening degree, if the opening degree range of the low-temperature cooling air valve is the maximum value within the first preset range, and the energy demand range within which the system energy demand is the maximum energy demand range, wherein the third preset opening degree is lower than the fourth preset opening degree.

According to some embodiments of the present disclosure, the determining module is further configured to: determine that the opening degree of the low-temperature cooling air valve is a fifth preset opening degree, if the opening degree range of the low-temperature cooling air valve is decreased by the first preset percentage relative to the first preset range, and an energy demand range within which the system energy demand is the minimum energy demand range; determine that the opening degree of the low-temperature cooling air valve is a sixth preset opening degree, if the opening degree range of the low-temperature cooling air valve is decreased by the first preset percentage relative to the first preset range, and the energy demand range within which the system energy demand is a first energy demand range, wherein the fifth preset opening degree is lower than the sixth preset opening degree; determine that the opening degree of the low-temperature cooling air valve is a seventh preset opening degree, if the opening degree range of the low-temperature cooling air valve is decreased by the first preset percentage relative to the first preset range, and the energy demand range within which the system energy demand is a second energy demand range, wherein the sixth preset opening degree is lower than the seventh preset opening degree; and determine that the opening degree of the low-temperature cooling air valve is an eighth preset opening degree, if the opening degree range of the low-temperature cooling air valve is decreased by the first preset percentage relative to the first preset range, and the energy demand range within which the system energy demand is the maximum demand range, wherein the seventh preset opening degree is lower than the eighth preset opening degree.

According to some embodiments of the present disclosure, the determining module is further configured to: determine that the opening degree of the low-temperature cooling air valve is a ninth preset opening degree, if the opening degree range of the low-temperature cooling air valve is decreased by the second preset percentage relative to the first preset range, and an energy demand range within which the system energy demand is the minimum energy demand range; determine that the opening degree of the low-temperature cooling air valve is a tenth preset opening degree, if the opening degree range of the low-temperature cooling air valve is decreased by the second preset percentage relative to the first preset range, and the energy demand range within which the system energy demand is a first energy demand range, wherein the ninth preset opening degree is lower than the tenth preset opening degree; determine that the opening degree of the low-temperature cooling air valve is an eleventh preset opening degree, if the opening degree range of the low-temperature cooling air valve is decreased by the second preset percentage relative to the first preset range, and the energy demand range within which the system energy demand is a second energy demand range, wherein the tenth preset opening degree is lower than the eleventh preset opening degree; and determine that the opening degree of the low-temperature cooling air valve is a twelfth preset opening degree, if the opening degree range of the low-temperature cooling air valve is decreased by the second preset percentage relative to the first preset range, and the energy demand range within which the system energy demand is the maximum energy demand range, wherein the eleventh preset opening degree is lower than the twelfth preset opening degree.

According to some embodiments of the present disclosure, the determining module is further configured to: determine that the opening degree of the low-temperature cooling air valve is a thirteenth preset opening degree, if the opening degree range of the low-temperature cooling air valve is the minimum value within the first preset range, and an energy demand range within which the system energy demand is the minimum energy demand range; determine that the opening degree of the low-temperature cooling air valve is a fourteenth preset opening degree, if the opening degree range of the low-temperature cooling air valve is the minimum value within the first preset range, and the energy demand range within which the system energy demand is a first energy demand range, wherein the thirteenth preset opening degree is lower than the fourteenth preset opening degree; determine that the opening degree of the low-temperature cooling air valve is a fifteenth preset opening degree, if the opening degree range of the low-temperature cooling air valve is the minimum value within the first preset range, and the energy demand range within which the system energy demand is a second energy demand range, wherein the fourteenth preset opening degree is lower than the fifteenth preset opening degree; and determine that the opening degree of the low-temperature cooling air valve is a sixteenth preset opening degree, if the opening degree range of the low-temperature cooling air valve is the minimum value within the first preset range, and the energy demand range within which the system energy demand is the maximum energy demand range, wherein the fifteenth preset opening degree is lower than the sixteenth preset opening degree.

According to some embodiments of the present disclosure, the determining module is further configured to: determine that the opening degree of the low-temperature cooling air valve is a seventeenth preset opening degree, if the opening degree range of the low-temperature cooling air valve is the maximum value within the second preset range, and an energy demand range within which the system energy demand is the minimum energy demand range; determine that the opening degree of the low-temperature cooling air valve is an eighteenth preset opening degree, if the opening degree range of the low-temperature cooling air valve is the maximum value within the second preset range, and the energy demand range within which the system energy demand is a first energy demand range, wherein the seventeenth preset opening degree is lower than the eighteenth preset opening degree; determine that the opening degree of the low-temperature cooling air valve is a nineteenth preset opening degree, if the opening degree range of the low-temperature cooling air valve is the maximum value within the second preset range, and the energy demand range within which the system energy demand is a second energy demand range, wherein the nineteenth preset opening degree is lower than the eighteenth preset opening degree; and determine that the opening degree of the low-temperature cooling air valve is a twentieth preset opening degree, if the opening degree range of the low-temperature cooling air valve is the maximum value within the second preset range, and the energy demand range within which the system energy demand is the maximum energy demand range, wherein the nineteenth preset opening degree is lower than the twentieth preset opening degree.

According to some embodiments of the present disclosure, the determining module is further configured to: determine that the opening degree of the low-temperature cooling air valve is a twenty-first preset opening degree, if the opening degree range of the low-temperature cooling air valve is decreased by the first preset percentage relative to the second preset range, and an energy demand range within which the system energy demand is the minimum energy demand range; determine that the opening degree of the low-temperature cooling air valve is a twenty-second preset opening degree, if the opening degree range of the low-temperature cooling air valve is decreased by the first preset percentage relative to the second preset range, and the energy demand range within which the system energy demand is a first energy demand range, wherein the twenty-first preset opening degree is lower than the twenty-second preset opening degree; determine that the opening degree of the low-temperature cooling air valve is a twenty-third preset opening degree, if the opening degree range of the low-temperature cooling air valve is decreased by the first preset percentage relative to the second preset range, and the energy demand range within which the system energy demand is a second energy demand range, wherein the twenty-first preset opening degree is lower than the twenty-third preset opening degree; and determine that the opening degree of the low-temperature cooling air valve is a twenty-fourth preset opening degree, if the opening degree range of the low-temperature cooling air valve is decreased by the first preset percentage relative to the second preset range, and the energy demand range within which the system energy demand is the maximum energy demand range, wherein the twenty-third preset opening degree is lower than the twenty-fourth preset opening degree.

According to some embodiments of the present disclosure, the determining module is further configured to: determine that the opening degree of the low-temperature cooling air valve is a twenty-fifth preset opening degree, if the opening degree range of the low-temperature cooling air valve is decreased by the second preset percentage relative to the second preset range, and an energy demand range within which the system energy demand is the minimum energy demand range; determine that the opening degree of the low-temperature cooling air valve is a twenty-sixth preset opening degree, if the opening degree range of the low-temperature cooling air valve is decreased by the second preset percentage relative to the second preset range, and the energy demand range within which the system energy demand is a first energy demand range, wherein the twenty-fifth preset opening degree is lower than the twenty-sixth preset opening degree; determine that the opening degree of the low-temperature cooling air valve is a twenty-seventh preset opening degree, if the opening degree range of the low-temperature cooling air valve is decreased by the second preset percentage relative to the second preset range, and the energy demand range within which the system energy demand is a second energy demand range, wherein the twenty-sixth preset opening degree is lower than the twenty-seventh preset opening degree; and determine that the opening degree of the low-temperature cooling air valve is a twenty-eighth preset opening degree, if the opening degree range of the low-temperature cooling air valve is decreased by the second preset percentage relative to the second preset range, and the energy demand range within which the system energy demand is the maximum energy demand range, wherein the twenty-seventh preset opening degree is lower than the twenty-eighth preset opening degree.

According to some embodiments of the present disclosure, the determining module is further configured to: determine that the opening degree of the low-temperature cooling air valve is a twenty-ninth preset opening degree, if the opening degree range of the low-temperature cooling air valve is the minimum value within the second preset range, and an energy demand range within which the system energy demand is the minimum energy demand range; determine that the opening degree of the low-temperature cooling air valve is a thirtieth preset opening degree, if the opening degree range of the low-temperature cooling air valve is the minimum value within the second preset range, and the energy demand range within which the system energy demand is a first energy demand range, wherein the twenty-ninth preset opening degree is lower than the thirtieth preset opening degree; determine that the opening degree of the low-temperature cooling air valve is a thirty-first preset opening degree, if the opening degree range of the low-temperature cooling air valve is the minimum value within the second preset range, and the energy demand range within which the system energy demand is a second energy demand range, wherein the thirtieth preset opening degree is lower than the thirty-first preset opening degree; and determine that the opening degree of the low-temperature cooling air valve is a thirty-second preset opening degree, if the opening degree range of the low-temperature cooling air valve is the minimum value within the second preset range, and the energy demand range within which the system energy demand is the maximum energy demand range, wherein the thirty-first preset opening degree is lower than the thirty-second preset opening degree.

The additional aspects and advantages of the present disclosure will be partially given in the following description, and some will become obvious from the following description, or be understood through the practice of the present disclosure.

BRIEF DESCRIPTION OF THE DRAWINGS

FIG. 6 is a flow chart showing a control method for determining an opening degree of a low-temperature cooling air valve according to a system energy demand according to a first specific embodiment of the present disclosure;

FIG. 7 is a flow chart showing a control method for determining an opening degree of a low-temperature cooling air valve according to a system energy demand according to a second specific embodiment of the present disclosure;

FIG. 8 is a flow chart showing a control method for determining an opening degree of a low-temperature cooling air valve according to a system energy demand according to a third specific embodiment of the present disclosure;

FIG. 9 is a flow chart showing a control method for determining an opening degree of a low-temperature cooling air valve according to a system energy demand according to a fourth specific embodiment of the present disclosure;

FIG. 10 is a flow chart showing a control method for determining an opening degree of a low-temperature cooling air valve according to a system energy demand according to a fifth specific embodiment of the present disclosure;

FIG. 11 is a flow chart showing a control method for determining an opening degree of a low-temperature cooling air valve according to a system energy demand according to a sixth specific embodiment of the present disclosure;

FIG. 12 is a flow chart showing a control method for determining an opening degree of a low-temperature cooling air valve according to a system energy demand according to a seventh specific embodiment of the present disclosure; and FIG. 13 is a block diagram showing a control device for a low-temperature cooling air valve according to some embodiments of the present disclosure.

DETAILED DESCRIPTION OF EMBODIMENTS

Figure 1:
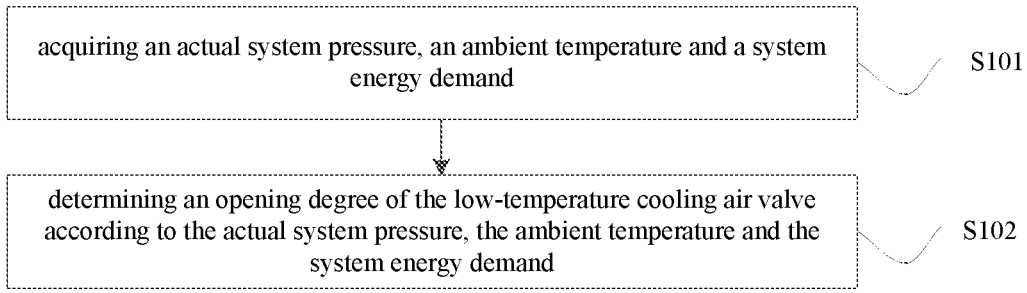
FIG. 1 is a flow chart showing a control method for a low-temperature cooling air valve according to some embodiments of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

The control method and device for a low-temperature cooling air valve according to embodiments of the present disclosure will be described below with reference to the accompanying drawings.

FIG. 1 is a flow chart showing a control method for a low-temperature cooling air valve according to some embodiments of the present disclosure.

As shown in FIG. 1, the control method for a low-temperature cooling air valve includes S101 and S102.

At S101, an actual system pressure, an ambient temperature, and a system energy demand are acquired.

In specific, according to some embodiments of the present disclosure, the actual system pressure Ps may be a discharge pressure of a compressor or a condensing pressure of a condenser. In other words, a pressure sensor may be arranged at any position, between an outlet of the compressor and an external heat exchanger, of a refrigerating system, to acquire the actual system pressure Ps.

Further, in the refrigerating system, a temperature sensor may be arranged at an outdoor unit, to acquire the current ambient temperature Ts. Besides, the system energy demand X of the refrigerating system may be acquired according to a set temperature set by a user.

At S102, an opening degree of the low-temperature cooling air valve is determined according to the actual system pressure, the ambient temperature, and the system energy demand.

Figure 2:
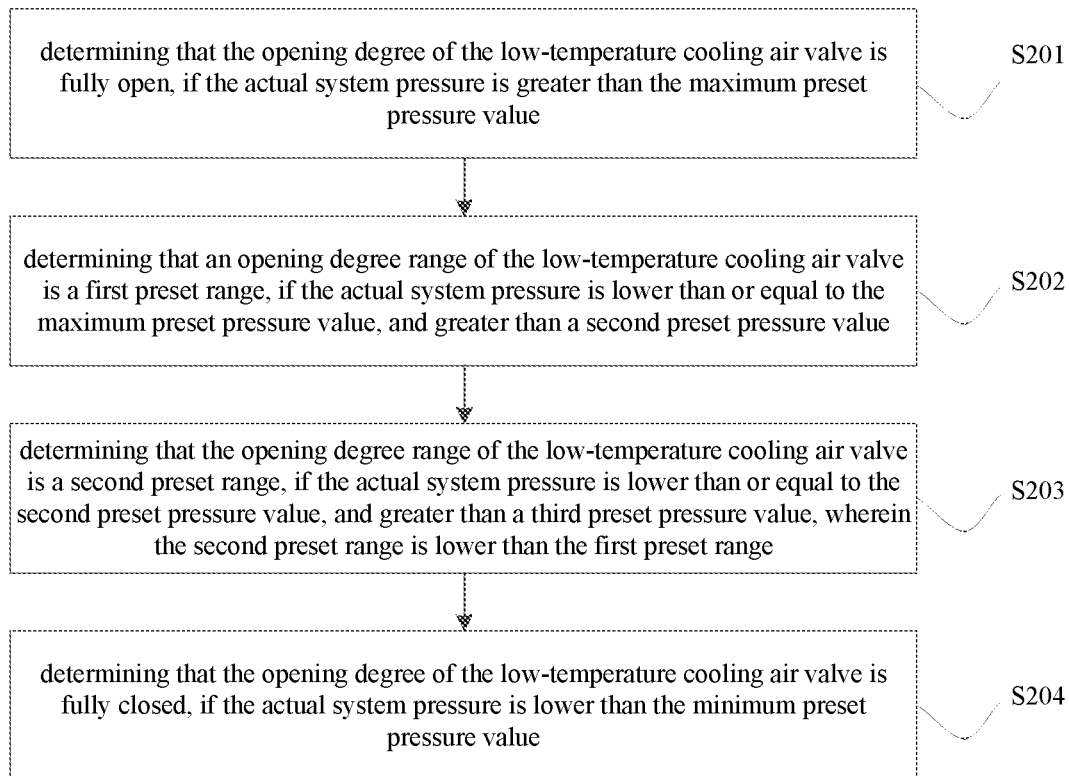
FIG. 2 is a flow chart showing a control method for determining an opening degree range of a low-temperature cooling air valve according to an actual system pressure according to some embodiments of the present disclosure.

In specific, as shown in FIG. 2, according to some embodiments of the present disclosure, determining the opening degree K of the low-temperature cooling air valve according to the actual system pressure Ps, the ambient temperature Ts, and the system energy demand X specifically includes S201 to S204.

At S201, if the actual system pressure is greater than the maximum preset pressure value, it is determined that the opening degree of the low-temperature cooling air valve is fully open.

In other words, when the actual system pressure Ps is greater than the maximum preset pressure value Pmax, i.e., when Ps>Pmax, it is determined that the opening degree K of the low-temperature cooling air valve is fully open.

At S202, if the actual system pressure is lower than or equal to the maximum preset pressure value, and greater than a second preset pressure value, it is determined that an opening degree range of the low-temperature cooling air valve is a first preset range.

In other words, when the actual system pressure Ps is lower than or equal to the maximum preset pressure value Pmax, and greater than the second preset pressure value P2, i.e., when P2<Ps≤Pmax, it is determined that the opening degree range of the low-temperature cooling air valve is the first preset range. The preset range may be set in advance, for example, the first preset range may be set as 80%~100%.

At S203, if the actual system pressure is lower than or equal to the second preset pressure value, and greater than a third preset pressure value, it is determined that the opening degree range of the low-temperature cooling air valve is a second preset range. The second preset range is lower than the first preset range.

In other words, when the actual system pressure Ps is lower than or equal to the second preset pressure value P2, and greater than the third preset pressure value P3, i.e., when P3<Ps≤P2, it is determined that the opening degree range of the low-temperature cooling air valve is the second preset range. For example, the second preset range may be set as 60%~80%.

It should be noted that, the preset range may be a plurality of preset ranges, the refrigerating system can choose a corresponding preset range according to a pressure range within which the actual system pressure is, thereby determining the opening degree range of the low-temperature cooling air valve.

At S204, if the actual system pressure is lower than the minimum preset pressure value, it is determined that the opening degree of the low-temperature cooling air valve is fully closed.

In other words, when the actual system pressure Ps is lower than the minimum preset pressure value Pmin, i.e., when Ps<Pmin, it is determined that the opening degree K of the low-temperature cooling air valve is fully closed.

Figure 3:
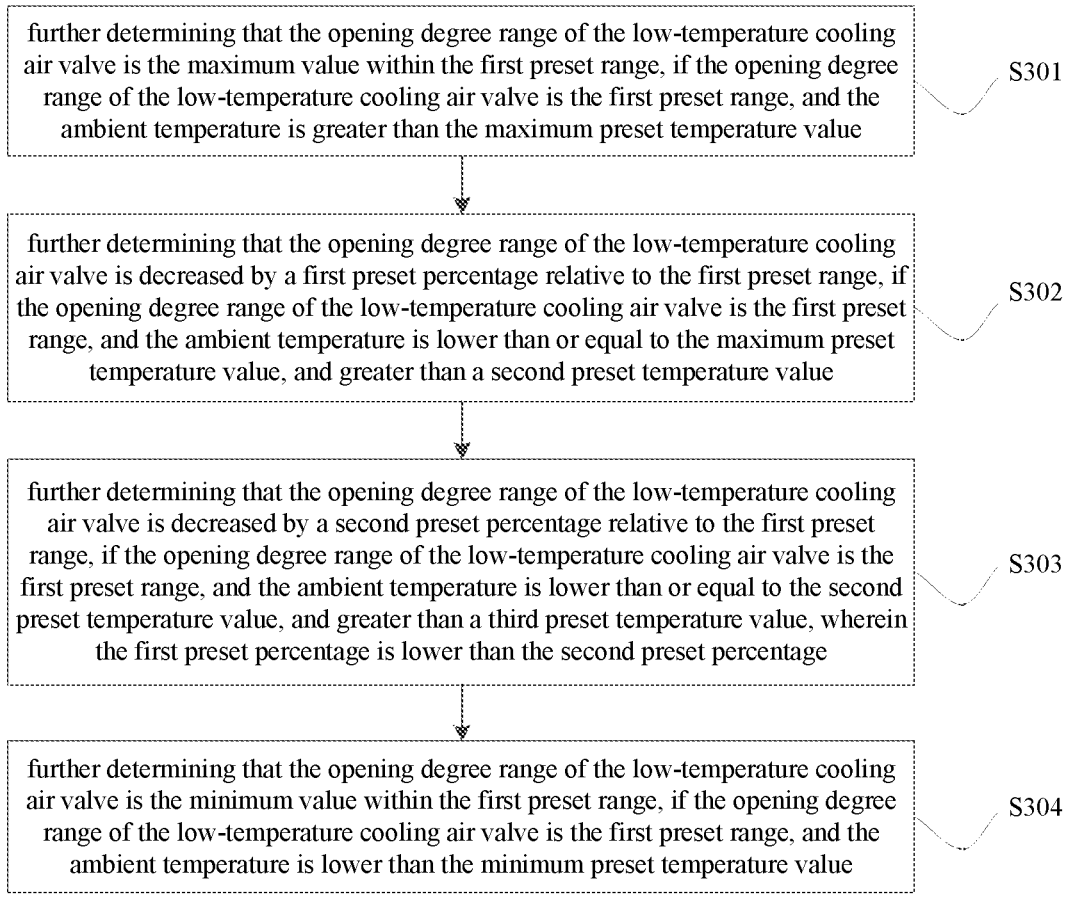
FIG. 3 is a flow chart showing a control method for further determining an opening degree range of a low-temperature cooling air valve according to an ambient temperature according to some embodiments of the present disclosure.

Further, as shown in FIG. 3, according to some embodiments of the present disclosure, the control method further includes S301 to S304.

At S301, if the opening degree range of the low-temperature cooling air valve is the first preset range, and the ambient temperature is greater than the maximum preset temperature value, it is further determined that the opening degree range of the low-temperature cooling air valve is the maximum value within the first preset range.

In other words, when the opening degree range of the low-temperature cooling air valve is the first preset range, e.g., 80%~100%, and the ambient temperature Ts is greater than the maximum preset temperature value Tmax, i.e., when Ts>Tmax, it is further determined that the opening degree range of the low-temperature cooling air valve is the maximum value within the first preset range. For example, it may be determined that the opening degree range of the low-temperature cooling air valve is 100%.

At S302, if the opening degree range of the low-temperature cooling air valve is the first preset range, and the ambient temperature is lower than or equal to the maximum preset temperature value and greater than a second preset temperature value, it is further determined that the opening degree range of the low-temperature cooling air valve is decreased by a first preset percentage relative to the first preset range.

In other words, when the opening degree range of the low-temperature cooling air valve is the first preset range, e.g., 80%~100%, and the ambient temperature Ts is lower than or equal to the maximum preset temperature value Tmax and greater than the second preset temperature value T2, i.e., when T2<Ts≤Tmax, it is further determined that the opening degree range of the low-temperature cooling air valve is decreased by the first preset percentage relative to the first preset range. The first preset percentage may be set in advance, for example, the first preset percentage may be set as 0%~5%, i.e., it is determined that the opening degree range of the low-temperature cooling air valve is 95%~100%.

At S303, if the opening degree range of the low-temperature cooling air valve is the first preset range, and the ambient temperature is lower than or equal to the second preset temperature value and greater than a third preset temperature value, it is further determined that the opening degree range of the low-temperature cooling air valve is decreased by a second preset percentage relative to the first preset range. The first preset percentage is lower than the second preset percentage.

In other words, when the opening degree range of the low-temperature cooling air valve is the first preset range, e.g., 80%~100%, and the ambient temperature Ts is lower than or equal to the second preset temperature value T2 and greater than the third preset temperature value T3, i.e., when T3<Ts≤T2, it is further determined that the opening degree range of the low-temperature cooling air valve is decreased by the second preset percentage relative to the first preset range. The second preset percentage may be set in advance, for example, the second preset percentage may be set as 5%~10%, i.e., it is determined that the opening degree range of the low-temperature cooling air valve is 90%~95%.

At S304, if the opening degree range of the low-temperature cooling air valve is the first preset range, and the ambient temperature is lower than the minimum preset temperature value, it is further determined that the opening degree range of the low-temperature cooling air valve is the minimum value within the first preset range.

In other words, when the opening degree range of the low-temperature cooling air valve is the first preset range, e.g., 80%~100%, and the ambient temperature Ts is lower than the minimum preset temperature value Tmin, i.e., when Ts<Tmin, it is further determined that the opening degree range of the low-temperature cooling air valve is the minimum value within the first preset range. For example, it may be determined that the opening degree range of the low-temperature cooling air valve is 80%.

Figure 4:
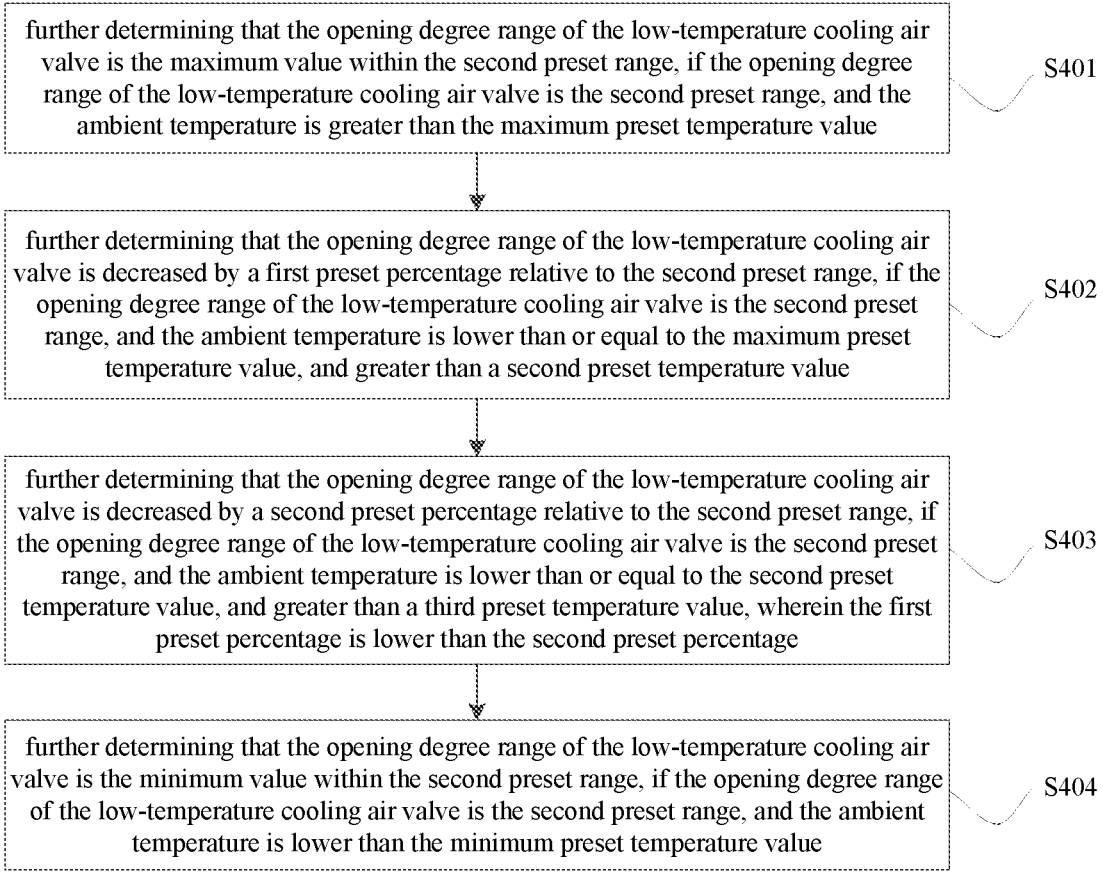
FIG. 4 is a flow chart showing a control method for further determining an opening degree range of a low-temperature cooling air valve according to an ambient temperature according to another embodiment of the present disclosure.

Further, as shown in FIG. 4, according to some embodiments of the present disclosure, the control method further includes S401 to S404.

At S401, if the opening degree range of the low-temperature cooling air valve is the second preset range, and the ambient temperature is greater than the maximum preset temperature value, it is further determined that the opening degree range of the low-temperature cooling air valve is the maximum value within the second preset range.

In other words, when the opening degree range of the low-temperature cooling air valve is the second preset range, e.g., 60%~80%, and the ambient temperature Ts is greater than the maximum preset temperature value Tmax, i.e., when Ts>Tmax, it is further determined that the opening degree range of the low-temperature cooling air valve is the maximum value within the second preset range. For example, it may be determined that the opening degree range of the low-temperature cooling air valve is 80%.

At S402, if the opening degree range of the low-temperature cooling air valve is the second preset range, and the ambient temperature is lower than or equal to the maximum preset temperature value and greater than a second preset temperature value, it is further determined that the opening degree range of the low-temperature cooling air valve is decreased by a first preset percentage relative to the second preset range.

In other words, when the opening degree range of the low-temperature cooling air valve is the second preset range, e.g., 60%~80%, and the ambient temperature Ts is lower than or equal to the maximum preset temperature value Tmax and greater than the second preset temperature value T2, i.e., when T2<Ts≤Tmax, it is further determined that the opening degree range of the low-temperature cooling air valve is decreased by the first preset percentage relative to the second preset range. For example, it may be determined that the opening degree range of the low-temperature cooling air valve is 75%~80%.

At S403, if the opening degree range of the low-temperature cooling air valve is the second preset range, and the ambient temperature is lower than or equal to the second preset temperature value and greater than a third preset temperature value, it is further determined that the opening degree range of the low-temperature cooling air valve is decreased by a second preset percentage relative to the second preset range. The first preset percentage is lower than the second preset percentage.

In other words, when the opening degree range of the low-temperature cooling air valve is the second preset range, e.g., 60%~80%, and the ambient temperature Ts is lower than or equal to the second preset temperature value T2 and greater than the third preset temperature value T3, i.e., when T3<Ts<T2, it is further determined that the opening degree range of the low-temperature cooling air valve is decreased by the second preset percentage relative to the second preset range. For example, it may be determined that the opening degree range of the low-temperature cooling air valve is 70%~75%.

At S404, if the opening degree range of the low-temperature cooling air valve is the second preset range, and the ambient temperature is lower than the minimum preset temperature value, it is further determined that the opening degree range of the low-temperature cooling air valve is the minimum value within the second preset range.

In other words, when the opening degree range of the low-temperature cooling air valve is the second preset range, e.g., 60%~80%, and the ambient temperature Ts is lower than the minimum preset temperature value Tmin, i.e., when Ts<Tmin, it is further determined that the opening degree range of the low-temperature cooling air valve is the minimum value within the second preset range. For example, it may be determined that the opening degree range of the low-temperature cooling air valve is 60%.

Figure 5:
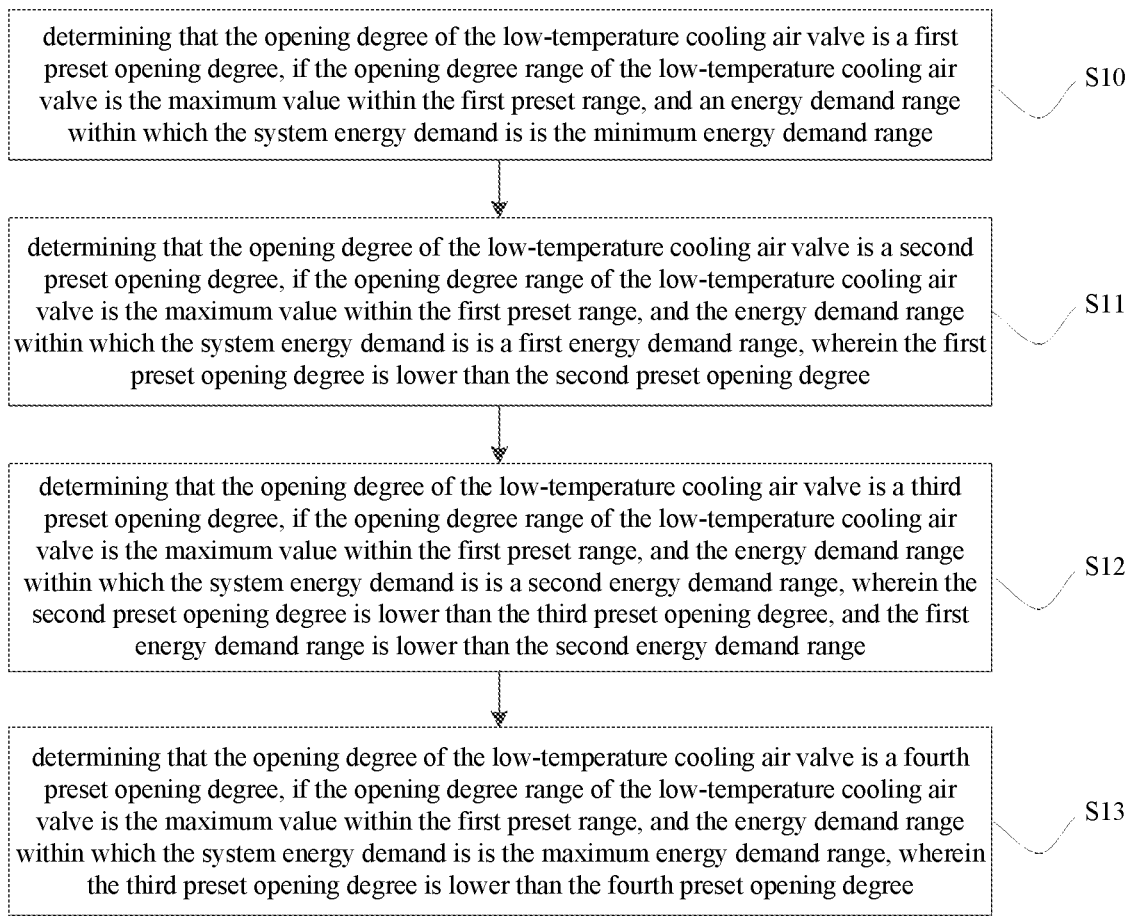
FIG. 5 is a flow chart showing a control method for determining an opening degree of a low-temperature cooling air valve according to a system energy demand according to a first specific embodiment of the present disclosure.

Further, as shown in FIG. 5, according to some embodiments of the present disclosure, the control method further includes S10 to S13.

At S10, if the opening degree range of the low-temperature cooling air valve is the maximum value within the first preset range, and an energy demand range within which the system energy demand is the minimum energy demand range, it is determined that the opening degree of the low-temperature cooling air valve is a first preset opening degree.

In other words, when the opening degree range of the low-temperature cooling air valve is the maximum value within the first preset range, and the energy demand range within which the system energy demand X is the minimum energy demand range Xmin, it is determined that the opening degree K of the low-temperature cooling air valve is the first preset opening degree K1.

At S11, if the opening degree range of the low-temperature cooling air valve is the maximum value within the first preset range, and the energy demand range within which the system energy demand is a first energy demand range, it is determined that the opening degree of the low-temperature cooling air valve is a second preset opening degree. The first preset opening degree is lower than the second preset opening degree.

In other words, when the opening degree range of the low-temperature cooling air valve is the maximum value within the first preset range, and the energy demand range within which the system energy demand X is the first energy demand range X1, i.e., when Xmin<X≤X1, it is determined that the opening degree K of the low-temperature cooling air valve is the second preset opening degree K2. The first preset opening degree K1 is lower than the second preset opening degree K2, i.e., K1<K2.

At S12, if the opening degree range of the low-temperature cooling air valve is the maximum value within the first preset range, and the energy demand range within which the system energy demand is a second energy demand range, it is determined that the opening degree of the low-temperature cooling air valve is a third preset opening degree. The second preset opening degree is lower than the third preset opening degree, and the first energy demand range is lower than the second energy demand range.

In other words, when the opening degree range of the low-temperature cooling air valve is the maximum value within the first preset range, and the energy demand range within which the system energy demand X is the second energy demand range X2, i.e., when X1<X≤X2, it is determined that the opening degree K of the low-temperature cooling air valve is the third preset opening degree K3. The second preset opening degree K2 is lower than the third preset opening degree K3, i.e., K2<K3.

At S13, if the opening degree range of the low-temperature cooling air valve is the maximum value within the first preset range, and the energy demand range within which the system energy demand is the maximum energy demand range, it is determined that the opening degree of the low-temperature cooling air valve is a fourth preset opening degree. The third preset opening degree is lower than the fourth preset opening degree.

In other words, when the opening degree range of the low-temperature cooling air valve is the maximum value within the first preset range, and the energy demand range within which the system energy demand X is the maximum energy demand range Xmax, it is determined that the opening degree K of the low-temperature cooling air valve is the fourth preset opening degree K4. The third preset opening degree K3 is lower than the fourth preset opening degree K4, i.e., K3<K4.

Further, as shown in FIG. 6, according to some embodiments of the present disclosure, the control method further includes S20 to S23.

At S20, if the opening degree range of the low-temperature cooling air valve is decreased by the first preset percentage relative to the first preset range, and an energy demand range within which the system energy demand is the minimum energy demand range, it is determined that the opening degree of the low-temperature cooling air valve is a fifth preset opening degree.

In other words, when the opening degree range of the low-temperature cooling air valve is decreased by the first preset percentage relative to the first preset range, and the energy demand range within which the system energy demand X is the minimum energy demand range Xmin, it is determined that the opening degree K of the low-temperature cooling air valve is the fifth preset opening degree K5.

At S21, if the opening degree range of the low-temperature cooling air valve is decreased by the first preset percentage relative to the first preset range, and the energy demand range within which the system energy demand is a first energy demand range, it is determined that the opening degree of the low-temperature cooling air valve is a sixth preset opening degree. The fifth preset opening degree is lower than the sixth preset opening degree.

In other words, when the opening degree range of the low-temperature cooling air valve is decreased by the first preset percentage relative to the first preset range, and the energy demand range within which the system energy demand X is the first energy demand range X1, i.e., when Xmin<X≤X1, it is determined that the opening degree K of the low-temperature cooling air valve is the sixth preset opening degree K6. The fifth preset opening degree K5 is lower than the sixth preset opening degree K6, i.e., K5<K6.

At S22, if the opening degree range of the low-temperature cooling air valve is decreased by the first preset percentage relative to the first preset range, and the energy demand range within which the system energy demand is a second energy demand range, it is determined that the opening degree of the low-temperature cooling air valve is a seventh preset opening degree. The sixth preset opening degree is lower than the seventh preset opening degree.

In other words, when the opening degree range of the low-temperature cooling air valve is decreased by the first preset percentage relative to the first preset range, and the energy demand range within which the system energy demand X is the second energy demand range X2, i.e., when X1<X≤X2, it is determined that the opening degree K of the low-temperature cooling air valve is the seventh preset opening degree K7. The sixth preset opening degree K6 is lower than the seventh preset opening degree K7, i.e., K6<K7.

At S23, if the opening degree range of the low-temperature cooling air valve is decreased by the first preset percentage relative to the first preset range, and the energy demand range within which the system energy demand is the maximum energy demand range, it is determined that the opening degree of the low-temperature cooling air valve is an eighth preset opening degree. The seventh preset opening degree is lower than the eighth preset opening degree.

In other words, when the opening degree range of the low-temperature cooling air valve is decreased by the first preset percentage relative to the first preset range, and the energy demand range within which the system energy demand X is the maximum energy demand range Xmax, it is determined that the opening degree K of the low-temperature cooling air valve is the eighth preset opening degree K8. The seventh preset opening degree K7 is lower than the eighth preset opening degree K8, i.e., K7<K8.

Further, as shown in FIG. 7, according to some embodiments of the present disclosure, the control method further includes S30 to S33.

At S30, if the opening degree range of the low-temperature cooling air valve is decreased by the second preset percentage relative to the first preset range, and an energy demand range within which the system energy demand is the minimum energy demand range, it is determined that the opening degree of the low-temperature cooling air valve is a ninth preset opening degree.

In other words, when the opening degree range of the low-temperature cooling air valve is decreased by the second preset percentage relative to the first preset range, and the energy demand range within which the system energy demand X is the minimum energy demand range Xmin, it is determined that the opening degree K of the low-temperature cooling air valve is the ninth preset opening degree K9.

At S31, if the opening degree range of the low-temperature cooling air valve is decreased by the second preset percentage relative to the first preset range, and the energy demand range within which the system energy demand is a first energy demand range, it is determined that the opening degree of the low-temperature cooling air valve is a tenth preset opening degree. The ninth preset opening degree is lower than the tenth preset opening degree.

In other words, when the opening degree range of the low-temperature cooling air valve is decreased by the second preset percentage relative to the first preset range, and the energy demand range within which the system energy demand X is the first energy demand range X1, i.e., when Xmin<X≤X1, it is determined that the opening degree K of the low-temperature cooling air valve is the tenth preset opening degree K10. The ninth preset opening degree K9 is lower than the tenth preset opening degree K10, i.e., K9<K10.

At S32, if the opening degree range of the low-temperature cooling air valve is decreased by the second preset percentage relative to the first preset range, and the energy demand range within which the system energy demand is a second energy demand range, it is determined that the opening degree of the low-temperature cooling air valve is an eleventh preset opening degree. The tenth preset opening degree is lower than the eleventh preset opening degree.

In other words, when the opening degree range of the low-temperature cooling air valve is decreased by the second preset percentage relative to the first preset range, and the energy demand range within which the system energy demand X is the second energy demand range X2, i.e., when X1<X≤X2, it is determined that the opening degree K of the low-temperature cooling air valve is the eleventh preset opening degree K11. The tenth preset opening degree K10 is lower than the eleventh preset opening degree K11, i.e., K10<K11.

At S33, if the opening degree range of the low-temperature cooling air valve is decreased by the second preset percentage relative to the first preset range, and the energy demand range within which the system energy demand is the maximum energy demand range, it is determined that the opening degree of the low-temperature cooling air valve is a twelfth preset opening degree. The eleventh preset opening degree is lower than the twelfth preset opening degree.

In other words, when the opening degree range of the low-temperature cooling air valve is decreased by the second preset percentage relative to the first preset range, and the energy demand range within which the system energy demand X is the maximum energy demand range Xmax, it is determined that the opening degree K of the low-temperature cooling air valve is the twelfth preset opening degree K12. The eleventh preset opening degree K11 is lower than the twelfth preset opening degree K12, i.e., K11<K12.

Further, as shown in FIG. 8, according to some embodiments of the present disclosure, the control method further includes S40 to S43.

At S40, if the opening degree range of the low-temperature cooling air valve is the minimum value within the first preset range, and an energy demand range within which the system energy demand is the minimum energy demand range, it is determined that the opening degree of the low-temperature cooling air valve is a thirteenth preset opening degree.

In other words, when the opening degree range of the low-temperature cooling air valve is the minimum value within the first preset range, and the energy demand range within which the system energy demand X is the minimum energy demand range Xmin, it is determined that the opening degree K of the low-temperature cooling air valve is the thirteenth preset opening degree K13.

At S41, if the opening degree range of the low-temperature cooling air valve is the minimum value within the first preset range, and the energy demand range within which the system energy demand is a first energy demand range, it is determined that the opening degree of the low-temperature cooling air valve is a fourteenth preset opening degree. The thirteenth preset opening degree is lower than the fourteenth preset opening degree.

In other words, when the opening degree range of the low-temperature cooling air valve is the minimum value within the first preset range, and the energy demand range within which the system energy demand X is the first energy demand range X1, i.e., when Xmin<X≤X1, it is determined that the opening degree K of the low-temperature cooling air valve is the fourteenth preset opening degree K14. The thirteenth preset opening degree K13 is lower than the fourteenth preset opening degree K14, i.e., K13<K14.

At S42, if the opening degree range of the low-temperature cooling air valve is the minimum value within the first preset range, and the energy demand range within which the system energy demand is a second energy demand range, it is determined that the opening degree of the low-temperature cooling air valve is a fifteenth preset opening degree. The fourteenth preset opening degree is lower than the fifteenth preset opening degree.

In other words, when the opening degree range of the low-temperature cooling air valve is the minimum value within the first preset range, and the energy demand range within which the system energy demand X is the second energy demand range X2, i.e., when X1<X≤X2, it is determined that the opening degree K of the low-temperature cooling air valve is the fifteenth preset opening degree K15. The fourteenth preset opening degree K14 is lower than the fifteenth preset opening degree K15, i.e., K14<K15.

At S43, if the opening degree range of the low-temperature cooling air valve is the minimum value within the first preset range, and the energy demand range within which the system energy demand is the maximum energy demand range, it is determined that the opening degree of the low-temperature cooling air valve is a sixteenth preset opening degree. The fifteenth preset opening degree is lower than the sixteenth preset opening degree.

In other words, when the opening degree range of the low-temperature cooling air valve is the minimum value within the first preset range, and the energy demand range within which the system energy demand X is the maximum energy demand range Xmax, it is determined that the opening degree K of the low-temperature cooling air valve is the sixteenth preset opening degree K16. The fifteenth preset opening degree K15 is lower than the sixteenth preset opening degree K16, i.e., K15<K16.

Further, as shown in FIG. 9, according to some embodiments of the present disclosure, the control method further includes S50 to S53.

At S50, if the opening degree range of the low-temperature cooling air valve is the maximum value within the second preset range, and an energy demand range within which the system energy demand is the minimum energy demand range, it is determined that the opening degree of the low-temperature cooling air valve is a seventeenth preset opening degree.

In other words, when the opening degree range of the low-temperature cooling air valve is the maximum value within the second preset range, and the energy demand range within which the system energy demand X is the minimum energy demand range Xmin, it is determined that the opening degree K of the low-temperature cooling air valve is the seventeenth preset opening degree K17.

At S51, if the opening degree range of the low-temperature cooling air valve is the maximum value within the second preset range, and the energy demand range within which the system energy demand is a first energy demand range, it is determined that the opening degree of the low-temperature cooling air valve is an eighteenth preset opening degree. The seventeen preset opening degree is lower than the eighteenth preset opening degree.

In other words, when the opening degree range of the low-temperature cooling air valve is the maximum value within the second preset range, and the energy demand range within which the system energy demand X is the first energy demand range X1, i.e., when Xmin<X≤X1, it is determined that the opening degree K of the low-temperature cooling air valve is the eighteenth preset opening degree K18. The seventeen preset opening degree K17 is lower than the eighteenth preset opening degree K18, i.e., K17<K18.

At S52, if the opening degree range of the low-temperature cooling air valve is the maximum value within the second preset range, and the energy demand range within which the system energy demand is a second energy demand range, it is determined that the opening degree of the low-temperature cooling air valve is a nineteenth preset opening degree. The nineteenth preset opening degree is higher than the eighteenth preset opening degree.

In other words, when the opening degree range of the low-temperature cooling air valve is the maximum value within the second preset range, and the energy demand range within which the system energy demand X is the second energy demand range X2, i.e., when X1<X≤X2, it is determined that the opening degree K of the low-temperature cooling air valve is the nineteenth preset opening degree K19. The eighteenth preset opening degree K18 is lower than the nineteenth preset opening degree K19, i.e., K18<K19.

At S53, if the opening degree range of the low-temperature cooling air valve is the maximum value within the second preset range, and the energy demand range within which the system energy demand is the maximum energy demand range, it is determined that the opening degree of the low-temperature cooling air valve is a twentieth preset opening degree. The nineteenth preset opening degree is lower than the twentieth preset opening degree.

In other words, when the opening degree range of the low-temperature cooling air valve is the maximum value within the second preset range, and the energy demand range within which the system energy demand X is the maximum energy demand range Xmax, it is determined that the opening degree K of the low-temperature cooling air valve is the twentieth preset opening degree K20. The nineteenth preset opening degree K19 is lower than the twentieth preset opening degree K20, i.e., K19<K20.

Further, as shown in FIG. 10, according to some embodiments of the present disclosure, the control method includes S60 to S63.

At S60, if the opening degree range of the low-temperature cooling air valve is decreased by the first preset percentage relative to the second preset range, and an energy demand range within which the system energy demand is the minimum energy demand range, it is determined that the opening degree of the low-temperature cooling air valve is a twenty-first preset opening degree.

In other words, when the opening degree range of the low-temperature cooling air valve is decreased by the first preset percentage relative to the second preset range, and the energy demand range within which the system energy demand X is the minimum energy demand range Xmin, it is determined that the opening degree K of the low-temperature cooling air valve is the twenty-first preset opening degree K21.

At S61, if the opening degree range of the low-temperature cooling air valve is decreased by the first preset percentage relative to the second preset range, and the energy demand range within which the system energy demand is a first energy demand range, it is determined that the opening degree of the low-temperature cooling air valve is a twenty-second preset opening degree. The twenty-first preset opening degree is lower than the twenty-second preset opening degree.

In other words, when the opening degree range of the low-temperature cooling air valve is decreased by the first preset percentage relative to the second preset range, and the energy demand range within which the system energy demand X is the first energy demand range X1, i.e., when Xmin<X≤X1, it is determined that the opening degree K of the low-temperature cooling air valve is the twenty-second preset opening degree K22. The twenty-first preset opening degree K21 is lower than the twenty-second preset opening degree K22, i.e., K21<K22.

At S62, if the opening degree range of the low-temperature cooling air valve is decreased by the first preset percentage relative to the second preset range, and the energy demand range within which the system energy demand is a second energy demand range, it is determined that the opening degree of the low-temperature cooling air valve is a twenty-third preset opening degree. The twenty-second preset opening degree is lower than the twenty-third preset opening degree.

In other words, when the opening degree range of the low-temperature cooling air valve is decreased by the first preset percentage relative to the second preset range, and the energy demand range within which the system energy demand X is the second energy demand range X2, i.e., when $X1<X\leq X2$, it is determined that the opening degree K of the low-temperature cooling air valve is the twenty-third preset opening degree K23. The twenty-second preset opening degree K22 is lower than the twenty-third preset opening degree K23, i.e., $K22<K23$.

At S63, if the opening degree range of the low-temperature cooling air valve is decreased by the first preset percentage relative to the second preset range, and the energy demand range within which the system energy demand is the maximum energy demand range, it is determined that the opening degree of the low-temperature cooling air valve is a twenty-fourth preset opening degree. The twenty-third preset opening degree is lower than the twenty-fourth preset opening degree.

In other words, when the opening degree range of the low-temperature cooling air valve is decreased by the first preset percentage relative to the second preset range, and the energy demand range within which the system energy demand X is the maximum energy demand range Xmax, it is determined that the opening degree K of the low-temperature cooling air valve is the twenty-fourth preset opening degree K24. The twenty-third preset opening degree K23 is lower than the twenty-fourth preset opening degree K24, i.e., $K23<K24$.

Further, as shown in FIG. 11, according to some embodiments of the present disclosure, the control method further includes S70 to S73.

At S70, if the opening degree range of the low-temperature cooling air valve is decreased by the second preset percentage relative to the second preset range, and an energy demand range within which the system energy demand is the minimum energy demand range, it is determined that the opening degree of the low-temperature cooling air valve is a twenty-fifth preset opening degree.

In other words, when the opening degree range of the low-temperature cooling air valve is decreased by the second preset percentage relative to the second preset range, and the energy demand range within which the system energy demand X is the minimum energy demand range Xmin, it is determined that the opening degree K of the low-temperature cooling air valve is the twenty-fifth preset opening degree K25.

At S71, if the opening degree range of the low-temperature cooling air valve is decreased by the second preset percentage relative to the second preset range, and the energy demand range within which the system energy demand is a first energy demand range, it is determined that the opening degree of the low-temperature cooling air valve is a twenty-sixth preset opening degree. The twenty-fifth preset opening degree is lower than the twenty-sixth preset opening degree.

In other words, when the opening degree range of the low-temperature cooling air valve is decreased by the second preset percentage relative to the second preset range, and the energy demand range within which the system energy demand X is the first energy demand range X1, i.e., when $Xmin<X\leq X1$, it is determined that the opening degree K of the low-temperature cooling air valve is the twenty-sixth preset opening degree K26. The twenty-fifth preset opening degree K25 is lower than the twenty-sixth preset opening degree K26, i.e., $K25<K26$.

At S72, if the opening degree range of the low-temperature cooling air valve is decreased by the second preset percentage relative to the second preset range, and the energy demand range within which the system energy demand is a second energy demand range, it is determined that the opening degree of the low-temperature cooling air valve is a twenty-seventh preset opening degree. The twenty-sixth preset opening degree is lower than the twenty-seventh preset opening degree.

In other words, when the opening degree range of the low-temperature cooling air valve is decreased by the second preset percentage relative to the second preset range, and the energy demand range within which the system energy demand X is the second energy demand range X2, i.e., when $X1<X\leq X2$, it is determined that the opening degree K of the low-temperature cooling air valve is the twenty-seventh preset opening degree K27. The twenty-sixth preset opening degree K26 is lower than the twenty-seventh preset opening degree K27.

At S73, if the opening degree range of the low-temperature cooling air valve is decreased by the second preset percentage relative to the second preset range, and the energy demand range within which the system energy demand is the maximum energy demand range, it is determined that the opening degree of the low-temperature cooling air valve is a twenty-eighth preset opening degree. The twenty-seventh preset opening degree is lower than the twenty-eighth preset opening degree.

In other words, when the opening degree range of the low-temperature cooling air valve is decreased by the second preset percentage relative to the second preset range, and the energy demand range within which the system energy demand X is the maximum energy demand range Xmax, it is determined that the opening degree K of the low-temperature cooling air valve is the twenty-eighth preset opening degree K28. The twenty-seventh preset opening degree K27 is lower than the twenty-eighth preset opening degree K28, i.e., $K27<K28$.

Further, as shown in FIG. 12, according to some embodiments of the present disclosure, the control method further includes S80 to S83.

At S80, if the opening degree range of the low-temperature cooling air valve is the minimum value within the second preset range, and an energy demand range within which the system energy demand is the minimum energy demand range, it is determined that the opening degree of the low-temperature cooling air valve is a twenty-ninth preset opening degree.

In other words, when the opening degree range of the low-temperature cooling air valve is the minimum value within the second preset range, and the energy demand range within which the system energy demand X is the minimum energy demand range Xmin, it is determined that the opening degree K of the low-temperature cooling air valve is the twenty-ninth preset opening degree K29.

At S81, if the opening degree range of the low-temperature cooling air valve is the minimum value within the second preset range, and the energy demand range within which the system energy demand is a first energy demand range, it is determined that the opening degree of the low-temperature cooling air valve is a thirtieth preset opening degree. The twenty-ninth preset opening degree is lower than the thirtieth preset opening degree.

In other words, when the opening degree range of the low-temperature cooling air valve is the minimum value within the second preset range, and the energy demand range within which the system energy demand X is the first energy demand range X1, i.e., when Xmin<X≤X1, it is determined that the opening degree K of the low-temperature cooling air valve is the thirtieth preset opening degree K30. The twenty-ninth preset opening degree K29 is lower than the thirtieth preset opening degree K30, i.e., K29<K30.

At S82, if the opening degree range of the low-temperature cooling air valve is the minimum value within the second preset range, and the energy demand range within which the system energy demand is a second energy demand range, it is determined that the opening degree of the low-temperature cooling air valve is a thirty-first preset opening degree. The thirtieth preset opening degree is lower than the thirty-first preset opening degree.

In other words, when the opening degree range of the low-temperature cooling air valve is the minimum value within the second preset range, and the energy demand range within which the system energy demand X is the second energy demand range X2, i.e., when X1<X≤X2, it is determined that the opening degree K of the low-temperature cooling air valve is the thirty-first preset opening degree K31. The thirtieth preset opening degree K30 is lower than the thirty-first preset opening degree K31, i.e., K30<K31.

At S83, if the opening degree range of the low-temperature cooling air valve is the minimum value within the second preset range, and the energy demand range within which the system energy demand is the maximum energy demand range, it is determined that the opening degree of the low-temperature cooling air valve is a thirty-second preset opening degree. The thirty-first preset opening degree is lower than the thirty-second preset opening degree.

In other words, when the opening degree range of the low-temperature cooling air valve is the minimum value within the second preset range, and the energy demand range within which the system energy demand X is the maximum energy demand range Xmax, it is determined that the opening degree K of the low-temperature cooling air valve is the thirty-second preset opening degree K32. The thirty-first preset opening degree K31 is lower than the thirty-second preset opening degree K32, i.e., K31<K32.

For example, assuming that the actual system pressure Ps is lower than or equal to the maximum preset pressure value Pmax and greater than the second preset pressure value P2; the ambient temperature Ts is lower than or equal to the maximum preset temperature value Tmax and greater than the second preset temperature value T2; and the energy demand range within which the system energy demand X is the second energy demand range X2, the refrigerating system firstly determines that the opening degree range of the low-temperature cooling air valve is the first preset range according to the actual system pressure Ps; then further determines that the opening degree range of the low-temperature cooling air valve is decreased by the first preset percentage relative to the first preset range according to the ambient temperature Ts, and determines that the opening degree K of the low-temperature cooling air valve is the seventh opening degree K7 according to the system energy demand X.

It can be understood that, in some embodiments of the present disclosure, it may also determine the opening degree range of the low-temperature cooling air valve according to the ambient temperature Ts or the system energy demand X; then determine the opening degree range of the low-temperature cooling air valve according to the system pressure Ps or the system energy demand X; and determine the opening degree K of the low-temperature cooling air valve according to the system pressure Ps or the ambient temperature Ts.

In summary, according to embodiments of the present disclosure, the control method for a low-temperature cooling air valve acquires the actual system pressure, the ambient temperature, and the system energy demand; and determines the opening degree of the low-temperature cooling air valve according to the actual system pressure, the ambient temperature, and the system energy demand, such that the low-temperature cooling air valve is coupling controlled according to the system high-pressure, the ambient temperature and the system energy demand, thereby being capable of refining the opening degree range of the low-temperature cooling air valve, and determining the opening degree of the low-temperature cooling air valve, thus favoring the cooling operation under the ultra-low temperature environment of a multi-split air conditioner, and at the same time improving reliability of the cooling operation at a low temperature, as well as expanding a cooling operation range.

FIG. 13 is a block diagram showing a control device for a low-temperature cooling air valve according to some embodiments of the present disclosure.

As shown in FIG. 13, the control device 100 for a low-temperature cooling air valve includes: an acquiring module 1 and a determining module 2.

The acquiring module 1 is configured to acquire an actual system pressure, an ambient temperature, and a system energy demand. The determining module 2 is configured to determine an opening degree according to the actual system pressure, the ambient temperature, and the system energy demand.

As such, the low-temperature cooling air valve is coupling controlled according to the system high-pressure, the ambient temperature and the system energy demand, the opening degree range of the low-temperature cooling air valve is refined, and the opening degree of the low-temperature cooling air valve is determined, thus favoring the cooling operation under the ultra-low temperature environment of a multi-split air conditioner, and at the same time improving reliability of the cooling operation at a low temperature, as well as expanding a cooling operation range.

Further, according to some embodiments of the present disclosure, the actual system pressure may be a discharge pressure of a compressor or a condensing pressure of a condenser.

Further, according to some embodiments of the present disclosure, the determining module 2 is further configured to: determine that the opening degree of the low-temperature cooling air valve is fully open, if the actual system pressure is greater than the maximum preset pressure value; determine that an opening degree range of the low-temperature cooling air valve is a first preset range, if the actual system pressure is lower than or equal to the maximum preset pressure value, and greater than a second preset pressure value; determine that the opening degree range of the low-temperature cooling air valve is a second preset range, if the actual system pressure is lower than or equal to the second preset pressure value, and greater than a third preset pressure value, wherein the second preset range is lower than the first preset range; and determine that the opening degree of the low-temperature cooling air valve is fully closed, if the actual system pressure is lower than the minimum preset pressure value.

Further, according to some embodiments of the present disclosure, the determining module 2 is further configured to: further determine that the opening degree range of the low-temperature cooling air valve is the maximum value within the first preset range, if the opening degree range of the low-temperature cooling air valve is the first preset range, and the ambient temperature is greater than the maximum preset temperature value; further determine that the opening degree range of the low-temperature cooling air valve is decreased by a first preset percentage relative to the first preset range, if the opening degree range of the low-temperature cooling air valve is the first preset range, and the ambient temperature is lower than or equal to the maximum preset temperature value, and greater than a second preset temperature value; further determine that the opening degree range of the low-temperature cooling air valve is decreased by a second preset percentage relative to the first preset range, if the opening degree range of the low-temperature cooling air valve is the first preset range, and the ambient temperature is lower than or equal to the second preset temperature value, and greater than a third preset temperature value, wherein the first preset percentage is lower than the second preset percentage; and further determine that the opening degree range of the low-temperature cooling air valve is the minimum value within the first preset range, if the opening degree range of the low-temperature cooling air valve is the first preset range, and the ambient temperature is lower than the minimum preset temperature value.

Further, according to some embodiments of the present disclosure, the determining module 2 is further configured to: further determine that the opening degree range of the low-temperature cooling air valve is the maximum value within the second preset range, if the opening degree range of the low-temperature cooling air valve is the second preset range, and the ambient temperature is greater than the maximum preset temperature value; further determine that the opening degree range of the low-temperature cooling air valve is decreased by a first preset percentage relative to the second preset range, if the opening degree range of the low-temperature cooling air valve is the second preset range, and the ambient temperature is lower than or equal to the maximum preset temperature value, and greater than a second preset temperature value; further determine that the opening degree range of the low-temperature cooling air valve is decreased by a second preset percentage relative to the second preset range, if the opening degree range of the low-temperature cooling air valve is the second preset range, and the ambient temperature is lower than or equal to the second preset temperature value, and greater than a third preset temperature value, wherein the first preset percentage is lower than the second preset percentage; and further determine that the opening degree range of the low-temperature cooling air valve is the minimum value within the second preset range, if the opening degree range of the low-temperature cooling air valve is the second preset range, and the ambient temperature is lower than the minimum preset temperature value.

Further, according to some embodiments of the present disclosure, the determining module 2 is further configured to: determine that the opening degree of the low-temperature cooling air valve is a first preset opening degree, if the opening degree range of the low-temperature cooling air valve is the maximum value within the first preset range, and an energy demand range within which the system energy demand is the minimum energy demand range; determine that the opening degree of the low-temperature cooling air valve is a second preset opening degree, if the opening degree range of the low-temperature cooling air valve is the maximum value within the first preset range, and the energy demand range within which the system energy demand is a first energy demand range, wherein the first preset opening degree is lower than the second preset opening degree; determine that the opening degree of the low-temperature cooling air valve is a third preset opening degree, if the opening degree range of the low-temperature cooling air valve is the maximum value within the first preset range, and the energy demand range within which the system energy demand is a second energy demand range, wherein the second preset opening degree is lower than the third preset opening degree, and the first energy demand range is lower than the second energy demand range; and determine that the opening degree of the low-temperature cooling air valve is a fourth preset opening degree, if the opening degree range of the low-temperature cooling air valve is the maximum value within the first preset range, and the energy demand range within which the system energy demand is the maximum energy demand range, wherein the third preset opening degree is lower than the fourth preset opening degree.

Further, according to some embodiments of the present disclosure, the determining module 2 is further configured to: determine that the opening degree of the low-temperature cooling air valve is a fifth preset opening degree, if the opening degree range of the low-temperature cooling air valve is decreased by the first preset percentage relative to the first preset range, and an energy demand range within which the system energy demand is the minimum energy demand range; determine that the opening degree of the low-temperature cooling air valve is a sixth preset opening degree, if the opening degree range of the low-temperature cooling air valve is decreased by the first preset percentage relative to the first preset range, and the energy demand range within which the system energy demand is a first energy demand range, wherein the fifth preset opening degree is lower than the sixth preset opening degree; determine that the opening degree of the low-temperature cooling air valve is a seventh preset opening degree, if the opening degree range of the low-temperature cooling air valve is decreased by the first preset percentage relative to the first preset range, and the energy demand range within which the system energy demand is a second energy demand range, wherein the sixth preset opening degree is lower than the seventh preset opening degree; and determine that the opening degree of the low-temperature cooling air valve is an eighth preset opening degree, if the opening degree range of the low-temperature cooling air valve is decreased by the first preset percentage relative to the first preset range, and the energy demand range within which the system energy demand is the maximum demand range, wherein the seventh preset opening degree is lower than the eighth preset opening degree.

Further, according to some embodiments of the present disclosure, the determining module 2 is further configured to: determine that the opening degree of the low-temperature cooling air valve is a ninth preset opening degree, if the opening degree range of the low-temperature cooling air valve is decreased by the second preset percentage relative to the first preset range, and an energy demand range within which the system energy demand is the minimum energy demand range; determine that the opening degree of the low-temperature cooling air valve is a tenth preset opening degree, if the opening degree range of the low-temperature cooling air valve is decreased by the second preset percentage relative to the first preset range, and the energy demand range within which the system energy demand is a first energy demand range, wherein the ninth preset opening degree is lower than the tenth preset opening degree; determine that the opening degree of the low-temperature cooling air valve is an eleventh preset opening degree, if the opening degree range of the low-temperature cooling air valve is decreased by the second preset percentage relative to the first preset range, and the energy demand range within which the system energy demand is a second energy demand range, wherein the tenth preset opening degree is lower than the eleventh preset opening degree; and determine that the opening degree of the low-temperature cooling air valve is a twelfth preset opening degree, if the opening degree range of the low-temperature cooling air valve is decreased by the second preset percentage relative to the first preset range, and the energy demand range within which the system energy demand is the maximum energy demand range, wherein the eleventh preset opening degree is lower than the twelfth preset opening degree.

Further, according to some embodiments of the present disclosure, the determining module 2 is further configured to: determine that the opening degree of the low-temperature cooling air valve is a thirteenth preset opening degree, if the opening degree range of the low-temperature cooling air valve is the minimum value within the first preset range, and an energy demand range within which the system energy demand is the minimum energy demand range; determine that the opening degree of the low-temperature cooling air valve is a fourteenth preset opening degree, if the opening degree range of the low-temperature cooling air valve is the minimum value within the first preset range, and the energy demand range within which the system energy demand is a first energy demand range, wherein the thirteenth preset opening degree is lower than the fourteenth preset opening degree; determine that the opening degree of the low-temperature cooling air valve is a fifteenth preset opening degree, if the opening degree range of the low-temperature cooling air valve is the minimum value within the first preset range, and the energy demand range within which the system energy demand is a second energy demand range, wherein the fourteenth preset opening degree is lower than the fifteenth preset opening degree; and determine that the opening degree of the low-temperature cooling air valve is a sixteenth preset opening degree, if the opening degree range of the low-temperature cooling air valve is the minimum value within the first preset range, and the energy demand range within which the system energy demand is the maximum energy demand range, wherein the fifteenth preset opening degree is lower than the sixteenth preset opening degree.

Further, according to some embodiments of the present disclosure, the determining module 2 is further configured to: determine that the opening degree of the low-temperature cooling air valve is a seventeenth preset opening degree, if the opening degree range of the low-temperature cooling air valve is the maximum value within the second preset range, and an energy demand range within which the system energy demand is the minimum energy demand range; determine that the opening degree of the low-temperature cooling air valve is an eighteenth preset opening degree, if the opening degree range of the low-temperature cooling air valve is the maximum value within the second preset range, and the energy demand range within which the system energy demand is a first energy demand range, wherein the seventeenth preset opening degree is lower than the eighteenth preset opening degree; determine that the opening degree of the low-temperature cooling air valve is a nineteenth preset opening degree, if the opening degree range of the low-temperature cooling air valve is the maximum value within the second preset range, and the energy demand range within which the system energy demand is a second energy demand range, wherein the nineteenth preset opening degree is higher than the eighteenth preset opening degree; and determine that the opening degree of the low-temperature cooling air valve is a twentieth preset opening degree, if the opening degree range of the low-temperature cooling air valve is the maximum value within the second preset range, and the energy demand range within which the system energy demand is the maximum energy demand range, wherein the nineteenth preset opening degree is lower than the twentieth preset opening degree.

Further, according to some embodiments of the present disclosure, the determining module 2 is further configured to: determine that the opening degree of the low-temperature cooling air valve is a twenty-first preset opening degree, if the opening degree range of the low-temperature cooling air valve is decreased by the first preset percentage relative to the second preset range, and an energy demand range within which the system energy demand is the minimum energy demand range; determine that the opening degree of the low-temperature cooling air valve is a twenty-second preset opening degree, if the opening degree range of the low-temperature cooling air valve is decreased by the first preset percentage relative to the second preset range, and the energy demand range within which the system energy demand is a first energy demand range, wherein the twenty-first preset opening degree is lower than the twenty-second preset opening degree; determine that the opening degree of the low-temperature cooling air valve is a twenty-third preset opening degree, if the opening degree range of the low-temperature cooling air valve is decreased by the first preset percentage relative to the second preset range, and the energy demand range within which the system energy demand is a second energy demand range, wherein the twenty-second preset opening degree is lower than the twenty-third preset opening degree; and determine that the opening degree of the low-temperature cooling air valve is a twenty-fourth preset opening degree, if the opening degree range of the low-temperature cooling air valve is decreased by the first preset percentage relative to the second preset range, and the energy demand range within which the system energy demand is the maximum energy demand range, wherein the twenty-third preset opening degree is lower than the twenty-fourth preset opening degree.

Further, according to some embodiments of the present disclosure, the determining module 2 is further configured to: determine that the opening degree of the low-temperature cooling air valve is a twenty-fifth preset opening degree, if the opening degree range of the low-temperature cooling air valve is decreased by the second preset percentage relative to the second preset range, and an energy demand range within which the system energy demand is the minimum energy demand range; determine that the opening degree of the low-temperature cooling air valve is a twenty-sixth preset opening degree, if the opening degree range of the low-temperature cooling air valve is decreased by the second preset percentage relative to the second preset range, and the energy demand range within which the system energy demand is a first energy demand range, wherein the twenty-fifth preset opening degree is lower than the twenty-sixth preset opening degree; determine that the opening degree of the low-temperature cooling air valve is a twenty-seventh preset opening degree, if the opening degree range of the low-temperature cooling air valve is decreased by the second preset percentage relative to the second preset range, and the energy demand range within which the system energy demand is a second energy demand range, wherein the twenty-sixth preset opening degree is lower than the twenty-seventh preset opening degree; and determine that the opening degree of the low-temperature cooling air valve is a twenty-eighth preset opening degree, if the opening degree range of the low-temperature cooling air valve is decreased by the second preset percentage relative to the second preset range, and the energy demand range within which the system energy demand is the maximum energy demand range, wherein the twenty-seventh preset opening degree is lower than the twenty-eighth preset opening degree.

Further, according to some embodiments of the present disclosure, the determining module 2 is further configured to: determine that the opening degree of the low-temperature cooling air valve is a twenty-ninth preset opening degree, if the opening degree range of the low-temperature cooling air valve is the minimum value within the second preset range, and an energy demand range within which the system energy demand is the minimum energy demand range; determine that the opening degree of the low-temperature cooling air valve is a thirtieth preset opening degree, if the opening degree range of the low-temperature cooling air valve is the minimum value within the second preset range, and the energy demand range within which the system energy demand is a first energy demand range, wherein the twenty-ninth preset opening degree is lower than the thirtieth preset opening degree; determine that the opening degree of the low-temperature cooling air valve is a thirty-first preset opening degree, if the opening degree range of the low-temperature cooling air valve is the minimum value within the second preset range, and the energy demand range within which the system energy demand is a second energy demand range, wherein the thirtieth preset opening degree is lower than the thirty-first preset opening degree; and determine that the opening degree of the low-temperature cooling air valve is a thirty-second preset opening degree, if the opening degree range of the low-temperature cooling air valve is the minimum value within the second preset range, and the energy demand range within which the system energy demand is the maximum energy demand range, wherein the thirty-first preset opening degree is lower than the thirty-second preset opening degree.

The control device for a low-temperature cooling air valve provided in embodiments of the present disclosure corresponds to the control method for a low-temperature cooling air valve as described above, which is not elaborated here.

In summary, according to embodiments of the present disclosure, the control device for a low-temperature cooling air valve acquires the actual system pressure, the ambient temperature, and the system energy demand by the acquiring module; and determines the opening degree of the low-temperature cooling air valve according to the actual system pressure, the ambient temperature, and the system energy demand by the determining module, such that the low-temperature cooling air valve is coupling controlled according to the system high-pressure, the ambient temperature and the system energy demand, thereby being capable of refining the opening degree range of the low-temperature cooling air valve, and determining the opening degree of the low-temperature cooling air valve, thus favoring the cooling operation under the ultra-low temperature environment of a multi-split air conditioner, and at the same time improving reliability of the cooling operation at a low temperature, as well as expanding a cooling operation range.

It should be noted that the logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples", in various places throughout this specification are not necessarily referring to the same embodiment or example of the present disclosure. Furthermore, the particular features, structures, materials, or characteristics may be combined in any suitable manner in one or more embodiments or examples.

In the specification, it should be understood that, the terms indicating orientation or position relationship such as "central", "longitudinal", "lateral", "width", "thickness", "above", "below", "front", "rear", "right", "left", "vertical", "horizontal", "top", "bottom", "inner", "outer", "clockwise", "counter-clockwise", "axial", "radial", "circumferential" should be construed to refer to the orientation or position relationship as then described or as shown in the drawings. These terms are merely for convenience and concision of description and do not alone indicate or imply that the device or element referred to must have a particular orientation or must be configured or operated in a particular orientation. Thus, it cannot be understood to limit the present disclosure.

In addition, terms such as "first" and "second" are used herein only for purposes of description and are not intended to indicate or imply relative importance or significance or impliedly indicate quantity of the technical feature referred to. Thus, the feature defined with "first" or "second" may comprise one or more this features. In the description of the present disclosure, "a plurality of" means at least two of this features, for example, two, three, etc., unless specifically defined otherwise.

In the present disclosure, unless specified or limited otherwise, the terms "mounted", "connected", "coupled", "fixed" and the like are used broadly, and may be, for example, fixed connections, detachable connections, or integrated connections; may also be mechanical or electrical connections; may also be direct connections or indirect connections via intervening structures, unless specifically defined otherwise; may also be inner communications of two elements or mutual interaction between two elements, which can be understood by those skilled in the art according to specific situations.

In the present invention, unless specified or limited otherwise, a structure in which a first feature is "on" or "below" a second feature may include some embodiments in which the first feature is in direct contact with the second feature, and may also include some embodiments in which the first feature and the second feature are not in direct contact with each other, but are contacted via an additional feature formed therebetween. Furthermore, a first feature "on," "above," or "on top of" a second feature may be some embodiments in which the first feature is right or obliquely "on," "above," or "on top of" the second feature, or just means that the first feature is at a height higher than that of the second feature; while a first feature "below," "under," or "on bottom of" a second feature may be some embodiments in which the first feature is right or obliquely "below," "under," or "on bottom of" the second feature, or just means that the first feature is at a height lower than that of the second feature.

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples", in various places throughout this specification are not necessarily referring to the same embodiment or example of the present disclosure. Furthermore, the particular features, structures, materials, or characteristics may be combined in any suitable manner in one or more embodiments or examples. In addition, those skilled in the art can combine different embodiments or examples and the features in the different embodiments or examples described in this specification without contradicting each other.

Although explanatory embodiments have been shown and described, it would be appreciated by those skilled in the art that the above embodiments cannot be construed to limit the present disclosure, and changes, alternatives, and modifications can be made in the embodiments in the scope of the present disclosure.

What is claimed is:

1. A control method for a low-temperature cooling air valve, comprising:
    acquiring an actual system pressure, an ambient temperature and a system energy demand; and
    determining an opening degree of the low-temperature cooling air valve according to the actual system pressure, the ambient temperature and the system energy demand, wherein said determining an opening degree of the low-temperature cooling air valve according to the actual system pressure, the ambient temperature and the system energy demand specifically comprises:
    determining that the opening degree of the low-temperature cooling air valve is fully open, if the actual system pressure is greater than a maximum preset pressure value;
    determining that an opening degree range of the low-temperature cooling air valve is a first preset range, if the actual system pressure is lower than or equal to the maximum preset pressure value, and greater than a second preset pressure value;
    determining that the opening degree range of the low-temperature cooling air valve is a second preset range, if the actual system pressure is lower than or equal to the second preset pressure value, and greater than a third preset pressure value, wherein the second preset range is lower than the first preset range;
    determining that the opening degree of the low-temperature cooling air valve is fully closed, if the actual system pressure is lower than a minimum preset pressure value, wherein the low-temperature cooling air valve is coupling controlled according to the actual system pressure, the ambient temperature and the system energy demand; and
    operating the low-temperature cooling air valve based on the determined opening degree to expand a cooling operation range.

2. The control method according to claim 1, wherein the actual system pressure is a discharge pressure of a compressor and a condensing pressure of a condenser.

3. The control method according to claim 1, further comprising:
    further determining that the opening degree range of the low-temperature cooling air valve is a maximum value within the first preset range, if the opening degree range of the low-temperature cooling air valve is the first preset range, and the ambient temperature is greater than a maximum preset temperature value;
    further determining that the opening degree range of the low-temperature cooling air valve is decreased by a first preset percentage relative to the first preset range, if the opening degree range of the low-temperature cooling air valve is the first preset range, and the ambient temperature is lower than or equal to the maximum preset temperature value, and greater than a second preset temperature value;
    further determining that the opening degree range of the low-temperature cooling air valve is decreased by a second preset percentage relative to the first preset range, if the opening degree range of the low-temperature cooling air valve is the first preset range, and the ambient temperature is lower than or equal to the second preset temperature value, and greater than a third preset temperature value, wherein the first preset percentage is lower than the second preset percentage; and further determining that the opening degree range of the low-temperature cooling air valve is a minimum value within the first preset range, if the opening degree range of the low-temperature cooling air valve is the first preset range, and the ambient temperature is lower than a minimum preset temperature value.

4. The control method according to claim 1, wherein it is further determined that the opening degree range of the low-temperature cooling air valve is a maximum value within the second preset range, if the opening degree range of the low-temperature cooling air valve is the second preset range, and the ambient temperature is greater than a maximum preset temperature value;

it is further determined that the opening degree range of the low-temperature cooling air valve is decreased by a first preset percentage relative to the second preset range, if the opening degree range of the low-temperature cooling air valve is the second preset range, and the ambient temperature is lower than or equal to the maximum preset temperature value, and greater than a second preset temperature value;

it is further determined that the opening degree range of the low-temperature cooling air valve is decreased by a second preset percentage relative to the second preset range, if the opening degree range of the low-temperature cooling air valve is the second preset range, and the ambient temperature is lower than or equal to the second preset temperature value, and greater than a third preset temperature value, wherein the first preset percentage is lower than the second preset percentage; and it is further determined that the opening degree range of the low-temperature cooling air valve is a minimum value within the second preset range, if the opening degree range of the low-temperature cooling air valve is the second preset range, and the ambient temperature is lower than a minimum preset temperature value.

5. The control method according to claim 3, wherein it is determined that the opening degree of the low-temperature cooling air valve is a first preset opening degree, if the opening degree range of the low-temperature cooling air valve is the maximum value within the first preset range, and an energy demand range within which the system energy demand is a minimum energy demand range;

it is determined that the opening degree of the low-temperature cooling air valve is a second preset opening degree, if the opening degree range of the low-temperature cooling air valve is the maximum value within the first preset range, and the energy demand range within which the system energy demand is a first energy demand range, wherein the first preset opening degree is lower than the second preset opening degree;

it is determined that the opening degree of the low-temperature cooling air valve is a third preset opening degree, if the opening degree range of the low-temperature cooling air valve is the maximum value within the first preset range, and the energy demand range within which the system energy demand is a second energy demand range, wherein the second preset opening degree is lower than the third preset opening degree, and the first energy demand range is lower than the second energy demand range; and it is determined that the opening degree of the low-temperature cooling air valve is a fourth preset opening degree, if the opening degree range of the low-temperature cooling air valve is the maximum value within the first preset range, and the energy demand range within which the system energy demand is a maximum energy demand range, wherein the third preset opening degree is lower than the fourth preset opening degree.

6. The control method according to claim 3, wherein it is determined that the opening degree of the low-temperature cooling air valve is a fifth preset opening degree, if the opening degree range of the low-temperature cooling air valve is decreased by the first preset percentage relative to the first preset range, and an energy demand range within which the system energy demand is a minimum energy demand range;

it is determined that the opening degree of the low-temperature cooling air valve is a sixth preset opening degree, if the opening degree range of the low-temperature cooling air valve is decreased by the first preset percentage relative to the first preset range, and the energy demand range within which the system energy demand is a first energy demand range, wherein the fifth preset opening degree is lower than the sixth preset opening degree;

it is determined that the opening degree of the low-temperature cooling air valve is a seventh preset opening degree, if the opening degree range of the low-temperature cooling air valve is decreased by the first preset percentage relative to the first preset range, and the energy demand range within which the system energy demand is a second energy demand range, wherein the sixth preset opening degree is lower than the seventh preset opening degree; and it is determined that the opening degree of the low-temperature cooling air valve is an eighth preset opening degree, if the opening degree range of the low-temperature cooling air valve is decreased by the first preset percentage relative to the first preset range, and the energy demand range within which the system energy demand is the maximum energy demand range, wherein the seventh preset opening degree is lower than the eighth preset opening degree.

7. The control method according to claim 3, wherein it is determined that the opening degree of the low-temperature cooling air valve is a ninth preset opening degree, if the opening degree range of the low-temperature cooling air valve is decreased by the second preset percentage relative to the first preset range, and an energy demand range within which the system energy demand is a minimum energy demand range;

it is determined that the opening degree of the low-temperature cooling air valve is a tenth preset opening degree, if the opening degree range of the low-temperature cooling air valve is decreased by the second preset percentage relative to the first preset range, and the energy demand range within which the system energy demand is a first energy demand range, wherein the ninth preset opening degree is lower than the tenth preset opening degree;

it is determined that the opening degree of the low-temperature cooling air valve is an eleventh preset opening degree, if the opening degree range of the low-temperature cooling air valve is decreased by the second preset percentage relative to the first preset range, and the energy demand range within which the system energy demand is a second energy demand range, wherein the tenth preset opening degree is lower than the eleventh preset opening degree; and it is determined that the opening degree of the low-temperature cooling air valve is a twelfth preset opening degree, if the opening degree range of the low-temperature cooling air valve is decreased by the second preset percentage relative to the first preset range, and the energy demand range within which the system energy demand is a maximum energy demand range, wherein the eleventh preset opening degree is lower than the twelfth preset opening degree.

8. The control method according to claim 3, wherein it is determined that the opening degree of the low-temperature cooling air valve is a thirteenth preset opening degree, if the opening degree range of the low-temperature cooling air valve is the minimum value within the first preset range, and an energy demand range within which the system energy demand is a minimum energy demand range;

it is determined that the opening degree of the low-temperature cooling air valve is a fourteenth preset opening degree, if the opening degree range of the low-temperature cooling air valve is the minimum value within the first preset range, and the energy demand range within which the system energy demand is a first energy demand range, wherein the thirteenth preset opening degree is lower than the fourteenth preset opening degree;

it is determined that the opening degree of the low-temperature cooling air valve is a fifteenth preset opening degree, if the opening degree range of the low-temperature cooling air valve is the minimum value within the first preset range, and the energy demand range within which the system energy demand is a second energy demand range, wherein the fourteenth preset opening degree is lower than the fifteenth preset opening degree; and it is determined that the opening degree of the low-temperature cooling air valve is a sixteenth preset opening degree, if the opening degree range of the low-temperature cooling air valve is the minimum value within the first preset range, and the energy demand range within which the system energy demand is a maximum energy demand range, wherein the fifteenth preset opening degree is lower than the sixteenth preset opening degree.

9. The control method according to claim 4, wherein it is determined that the opening degree of the low-temperature cooling air valve is a twenty-ninth preset opening degree, if the opening degree range of the low-temperature cooling air valve is the minimum value within the second preset range, and an energy demand range within which the system energy demand is a minimum energy demand range;

it is determined that the opening degree of the low-temperature cooling air valve is a thirtieth preset opening degree, if the opening degree range of the low-temperature cooling air valve is the minimum value within the second preset range, and the energy demand range within which the system energy demand is a first energy demand range, wherein the twenty-ninth preset opening degree is lower than the thirtieth preset opening degree;

it is determined that the opening degree of the low-temperature cooling air valve is a thirty-first preset opening degree, if the opening degree range of the low-temperature cooling air valve is the minimum value within the second preset range, and the energy demand range within which the system energy demand is a second energy demand range, wherein the thirtieth preset opening degree is lower than the thirty-first preset opening degree; and it is determined that the opening degree of the low-temperature cooling air valve is a thirty-second preset opening degree, if the opening degree range of the low-temperature cooling air valve is the minimum value within the second preset range, and the energy demand range within which the system energy demand is a maximum energy demand range, wherein the thirty-first preset opening degree is lower than the thirty-second preset opening degree.

10. A control device for a low-temperature cooling air valve, comprising:

an acquiring module, configured to acquire an actual system pressure, an ambient temperature and a system energy demand; and a determining module, configured to determine an opening degree of the low-temperature cooling air valve according to the actual system pressure, the ambient temperature and the system energy demand, wherein the determining module is further configured to:

determine that the opening degree of the low-temperature cooling air valve is fully open, if the actual system pressure is greater than a maximum preset pressure value;

determine that an opening degree range of the low-temperature cooling air valve is a first preset range, if the actual system pressure is lower than or equal to the maximum preset pressure value, and greater than a second preset pressure value;

determine that the opening degree range of the low-temperature cooling air valve is a second preset range, if the actual system pressure is lower than or equal to the second preset pressure value, and greater than a third preset pressure value, wherein the second preset range is lower than the first preset range;

determine that the opening degree of the low-temperature cooling air valve is fully closed, if the actual system pressure is lower than a minimum preset pressure value; and operate the low-temperature cooling air valve based on the determined opening degree to expand a cooling operation range.

11. The control device according to claim 10, wherein the actual system pressure is a discharge pressure of a compressor and a condensing pressure of a condenser.

12. The control device according to claim 10, wherein the determining module is further configured to:

further determine that the opening degree range of the low-temperature cooling air valve is a maximum value within the first preset range, if the opening degree range of the low-temperature cooling air valve is the first preset range, and the ambient temperature is greater than a maximum preset temperature value;

further determine that the opening degree range of the low-temperature cooling air valve is decreased by a first preset percentage relative to the first preset range, if the opening degree range of the low-temperature cooling air valve is the first preset range, and the ambient temperature is lower than or equal to the maximum preset temperature value, and greater than a second preset temperature value;

further determine that the opening degree range of the low-temperature cooling air valve is decreased by a second preset percentage relative to the first preset range, if the opening degree range of the low-temperature cooling air valve is the first preset range, and the ambient temperature is lower than or equal to the second preset temperature value, and greater than a third preset temperature value, wherein the first preset percentage is lower than the second preset percentage; and further determine that the opening degree range of the low-temperature cooling air valve is a minimum value within the first preset range, if the opening degree range of the low-temperature cooling air valve is the first preset range, and the ambient temperature is lower than a minimum preset temperature value.

13. The control device according to claim 10, wherein the determining module is further configured to:

further determine that the opening degree range of the low-temperature cooling air valve is a maximum value within the second preset range, if the opening degree range of the low-temperature cooling air valve is the second preset range, and the ambient temperature is greater than a maximum preset temperature value;

further determine that the opening degree range of the low-temperature cooling air valve is decreased by a first preset percentage relative to the second preset range, if the opening degree range of the low-temperature cooling air valve is the second preset range, and the ambient temperature is lower than or equal to the maximum preset temperature value, and greater than a second preset temperature value;

further determine that the opening degree range of the low-temperature cooling air valve is decreased by a second preset percentage relative to the second preset range, if the opening degree range of the low-temperature cooling air valve is the second preset range, and the ambient temperature is lower than or equal to the second preset temperature value, and greater than a third preset temperature value, wherein the first preset percentage is lower than the second preset percentage; and further determine that the opening degree range of the low-temperature cooling air valve is a minimum value within the second preset range, if the opening degree range of the low-temperature cooling air valve is the second preset range, and the ambient temperature is lower than a minimum preset temperature value.

14. The control device according to claim 12, wherein the determining module is further configured to:

determine that the opening degree of the low-temperature cooling air valve is a first preset opening degree, if the opening degree range of the low-temperature cooling air valve is the maximum value within the first preset range, and an energy demand range within which the system energy demand is a minimum energy demand range;

determine that the opening degree of the low-temperature cooling air valve is a second preset opening degree, if the opening degree range of the low-temperature cooling air valve is the maximum value within the first preset range, and the energy demand range within which the system energy demand is a first energy demand range, wherein the first preset opening degree is lower than the second preset opening degree;

determine that the opening degree of the low-temperature cooling air valve is a third preset opening degree, if the opening degree range of the low-temperature cooling air valve is the maximum value within the first preset range, and the energy demand range within which the system energy demand is a second energy demand range, wherein the second preset opening degree is lower than the third preset opening degree, and the first energy demand range is lower than the second energy demand range; and determine that the opening degree of the low-temperature cooling air valve is a fourth preset opening degree, if the opening degree range of the low-temperature cooling air valve is the maximum value within the first preset range, and the energy demand range within which the system energy demand is a maximum energy demand range, wherein the third preset opening degree is lower than the fourth preset opening degree.

15. The control device according to claim 12, wherein the determining module is further configured to:

determine that the opening degree of the low-temperature cooling air valve is a fifth preset opening degree, if the opening degree range of the low-temperature cooling air valve is decreased by the first preset percentage relative to the first preset range, and an energy demand range within which the system energy demand is a minimum energy demand range;

determine that the opening degree of the low-temperature cooling air valve is a sixth preset opening degree, if the opening degree range of the low-temperature cooling air valve is decreased by the first preset percentage relative to the first preset range, and the energy demand range within which the system energy demand is a first energy demand range, wherein the fifth preset opening degree is lower than the sixth preset opening degree;

determine that the opening degree of the low-temperature cooling air valve is a seventh preset opening degree, if the opening degree range of the low-temperature cooling air valve is decreased by the first preset percentage relative to the first preset range, and the energy demand range within which the system energy demand is a second energy demand range, wherein the sixth preset opening degree is lower than the seventh preset opening degree; and determine that the opening degree of the low-temperature cooling air valve is an eighth preset opening degree, if the opening degree range of the low-temperature cooling air valve is decreased by the first preset percentage relative to the first preset range, and the energy demand range within which the system energy demand is the maximum energy demand range, wherein the seventh preset opening degree is lower than the eighth preset opening degree.

16. The control device according to claim 12, wherein the determining module is further configured to:

determine that the opening degree of the low-temperature cooling air valve is a ninth preset opening degree, if the opening degree range of the low-temperature cooling air valve is decreased by the second preset percentage relative to the first preset range, and an energy demand range within which the system energy demand is a minimum energy demand range;

determine that the opening degree of the low-temperature cooling air valve is a tenth preset opening degree, if the opening degree range of the low-temperature cooling air valve is decreased by the second preset percentage relative to the first preset range, and the energy demand range within which the system energy demand is a first energy demand range, wherein the ninth preset opening degree is lower than the tenth preset opening degree;

determine that the opening degree of the low-temperature cooling air valve is an eleventh preset opening degree, if the opening degree range of the low-temperature cooling air valve is decreased by the second preset percentage relative to the first preset range, and the energy demand range within which the system energy demand is a second energy demand range, wherein the tenth preset opening degree is lower than the eleventh preset opening degree; and determine that the opening degree of the low-temperature cooling air valve is a twelfth preset opening degree, if the opening degree range of the low-temperature cooling air valve is decreased by the second preset percentage relative to the first preset range, and the energy demand range within which the system energy demand is a maximum energy demand range, wherein the eleventh preset opening degree is lower than the twelfth preset opening degree.

17. The control device according to claim 12, wherein the determining module is further configured to:

determine that the opening degree of the low-temperature cooling air valve is a thirteenth preset opening degree, if the opening degree range of the low-temperature cooling air valve is the minimum value within the first preset range, and an energy demand range within which the system energy demand is a minimum energy demand range;

determine that the opening degree of the low-temperature cooling air valve is a fourteenth preset opening degree, if the opening degree range of the low-temperature cooling air valve is the minimum value within the first preset range, and the energy demand range within which the system energy demand is a first energy demand range, wherein the thirteenth preset opening degree is lower than the fourteenth preset opening degree;

determine that the opening degree of the low-temperature cooling air valve is a fifteenth preset opening degree, if the opening degree range of the low-temperature cooling air valve is the minimum value within the first preset range, and the energy demand range within which the system energy demand is a second energy demand range, wherein the fourteenth preset opening degree is lower than the fifteenth preset opening degree; and determine that the opening degree of the low-temperature cooling air valve is a sixteenth preset opening degree, if the opening degree range of the low-temperature cooling air valve is the minimum value within the first preset range, and the energy demand range within which the system energy demand is a maximum energy demand range, wherein the fifteenth preset opening degree is lower than the sixteenth preset opening degree.

18. The control device according to claim 13, wherein the determining module is further configured to:

determine that the opening degree of the low-temperature cooling air valve is a twenty-ninth preset opening degree, if the opening degree range of the low-temperature cooling air valve is the minimum value within the second preset range, and an energy demand range within which the system energy demand is a minimum energy demand range;

determine that the opening degree of the low-temperature cooling air valve is a thirtieth preset opening degree, if the opening degree range of the low-temperature cooling air valve is the minimum value within the second preset range, and the energy demand range within which the system energy demand is a first energy demand range, wherein the twenty-ninth preset opening degree is lower than the thirtieth preset opening degree;

determine that the opening degree of the low-temperature cooling air valve is a thirty-first preset opening degree, if the opening degree range of the low-temperature cooling air valve is the minimum value within the second preset range, and the energy demand range within which the system energy demand is a second energy demand range, wherein the thirtieth preset opening degree is lower than the thirty-first preset opening degree; and determine that the opening degree of the low-temperature cooling air valve is a thirty-second preset opening degree, if the opening degree range of the low-temperature cooling air valve is the minimum value within the second preset range, and the energy demand range within which the system energy demand is a maximum energy demand range, wherein the thirty-first preset opening degree is lower than the thirty-second preset opening degree.

* * * * *